(12) United States Patent
Karamcheti et al.

(10) Patent No.: US 8,205,061 B2
(45) Date of Patent: *Jun. 19, 2012

(54) SEAMLESS APPLICATION ACCESS TO HYBRID MAIN MEMORY

(75) Inventors: Vijay Karamcheti, Los Altos, CA (US); Kenneth A. Okin, Saratoga, CA (US); Kumar Ganapathy, Los Altos, CA (US); Ashish Singhai, Cupertino, CA (US); Rajesh Parekh, Los Altos, CA (US)

(73) Assignee: Virident Systems Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,012

(22) Filed: Mar. 15, 2011

(65) Prior Publication Data

US 2011/0167205 A1 Jul. 7, 2011

Related U.S. Application Data

(63) Continuation of application No. 11/935,254, filed on Nov. 5, 2007, now Pat. No. 7,913,055.

(60) Provisional application No. 60/864,399, filed on Nov. 4, 2006.

(51) Int. Cl.
*G06F 13/00* (2006.01)

(52) U.S. Cl. ............... 711/170; 711/103; 711/146

(58) Field of Classification Search ............... 711/101, 711/103, 146, 170, 203

See application file for complete search history.

(56) References Cited

U.S. PATENT DOCUMENTS

| | | | |
|---|---|---|---|
| 4,757,533 A | 7/1988 | Allen et al. | |
| 5,012,408 A | 4/1991 | Conroy | |
| 5,404,485 A | 4/1995 | Ban | |
| 6,393,545 B1 | 5/2002 | Long et al. | |
| 6,549,959 B1 | 4/2003 | Yates et al. | |
| 6,564,326 B2 | 5/2003 | Helbig | |
| 6,970,968 B1 | 11/2005 | Holman | |
| 7,761,623 B2 * | 7/2010 | Karamcheti et al. | 710/62 |
| 7,761,624 B2 * | 7/2010 | Karamcheti et al. | 710/62 |
| 7,761,625 B2 * | 7/2010 | Karamcheti et al. | 710/62 |
| 7,761,626 B2 * | 7/2010 | Karamcheti et al. | 710/62 |
| 7,774,556 B2 * | 8/2010 | Karamcheti et al. | 711/146 |

(Continued)

OTHER PUBLICATIONS

Lee, H.G., and Chang, N., "Energy-Aware Memory Allocation in Heterogeneous Non-Volatile Memory Systems," Low Power Electronics and Design, Aug. 2003, retrieved from http://ieeexplore.ieee.org/iel5/8720/27594/01231941.pdf?tp=&isnumber=& arnumber= 12394> on May 1, 2008.

(Continued)

*Primary Examiner* — Reba I Elmore
(74) *Attorney, Agent, or Firm* — Fish & Richardson P.C.

(57) ABSTRACT

A command from an application is received to access a data structure associated with one or more virtual addresses mapped to main memory. A first subset of the virtual addresses for the data structure having constituent addresses that are mapped to the symmetric memory components and a second subset of the virtual addresses for the data structure having constituent addresses that are mapped to the asymmetric memory components are identified. Data associated with the virtual address from the first physical addresses and data associated with the virtual addresses from the second physical addresses are accessed. The data associated with the symmetric and asymmetric memory components is accessed by the application without providing the application with an indication of whether the data is accessed within the symmetric memory component or the asymmetric memory component.

20 Claims, 17 Drawing Sheets

U.S. PATENT DOCUMENTS

| | | | |
|---|---|---|---|
| 7,818,489 B2 * | 10/2010 | Karamcheti et al. | 711/101 |
| 7,913,055 B2 * | 3/2011 | Karamcheti et al. | 711/203 |
| 7,930,513 B2 * | 4/2011 | Karamcheti et al. | 711/203 |
| 2002/0051350 A1 | 5/2002 | Take | |
| 2002/0118593 A1 | 8/2002 | Takemae | |
| 2002/0133684 A1 | 9/2002 | Anderson | |
| 2002/0138600 A1 | 9/2002 | Singhal | |
| 2003/0137862 A1 | 7/2003 | Brunelle et al. | |
| 2003/0188083 A1 | 10/2003 | Kumar et al. | |
| 2004/0117581 A1 | 6/2004 | Lee | |
| 2004/0160835 A1 | 8/2004 | Altman et al. | |
| 2004/0186948 A1 | 9/2004 | Lofgren et al. | |
| 2004/0193783 A1 | 9/2004 | Sharma et al. | |
| 2005/0044303 A1 | 2/2005 | Perego et al. | |
| 2005/0166026 A1 | 7/2005 | Ware et al. | |
| 2005/0235131 A1 | 10/2005 | Ware | |
| 2005/0240745 A1 | 10/2005 | Iyer et al. | |
| 2005/0251617 A1 | 11/2005 | Sinclair et al. | |
| 2005/0273570 A1 | 12/2005 | DeSouter et al. | |
| 2005/0289317 A1 | 12/2005 | Liou et al. | |
| 2006/0106984 A1 | 5/2006 | Bartley et al. | |
| 2006/0149857 A1 | 7/2006 | Holman | |
| 2006/0230250 A1 | 10/2006 | Klint et al. | |
| 2009/0106478 A1 * | 4/2009 | Okin et al. | 711/1 |
| 2009/0157989 A1 * | 6/2009 | Karamcheti et al. | 711/156 |
| 2010/0325383 A1 * | 12/2010 | Karamcheti et al. | 711/203 |
| 2011/0022788 A1 * | 1/2011 | Karamcheti et al. | 711/103 |

OTHER PUBLICATIONS

Tseng, H.W., et al., "An Energy-Efficient Virtual Memory System with Flash Memory as the Secondary Storage," Low Power Electronics and Design, Oct. 4-6, 2006, retrieved from http://ieeexplore.ieee.org/xpls/abs_all.jsp?arnumber=4271879> on May 1, 2008.

International Search Report and Written Opinion for International Application No. PCT/US07/83669, dated Apr. 30, 2008, 9 pages.

International Search Report and Written Opinion for International Application No. PCT/US07/83671, dated May 22, 2008, 14 pages.

International Search Report and Written Opinion for International Application No. PCT/US07/83668, dated May 15, 2008, 8 pages.

International Search Report and Written Opinion for International Application No. PCT/US07/83666, dated Apr. 21, 2008, 9 pages.

International Search Report and Written Opinion for International Application No. PCT/US07/79622, dated Apr. 9, 2008, 12 pages.

Office Action for U.S. Appl. No. 11/864,763, mailed Jun. 16, 2008, 11 pages.

International Search Report and Written Opinion for International Application No. PCT/US07/80015, dated Aug. 13, 2008, 13 pages.

U.S. Notice of Allowance for U.S. Appl. No. 11/935,254 dated Nov. 15, 2010, 4 pages.

* cited by examiner

800

The memory controller receives a command from an application to access a data structure associated with one or more virtual addresses mapped to main memory
(810)

↓

The memory controller configures symmetric and asymmetric memory components of the main memory to interface with a memory table controller
(820)

↓

The memory controller queries, based on the virtual addresses associated with the data structure implicated by the received command and from within the memory table controller with which the symmetric and asymmetric memory components interface, a memory table that manages first virtual addresses associated with first physical addresses in symmetric memory components and second virtual addresses associated with second physical addresses within asymmetric memory components
(830)

↓

The memory controller identifies, based on results of the query of the memory table, a first subset of the virtual addresses for the data structure having constituent addresses that are mapped to the symmetric memory components and a second subset of the virtual addresses for the data structure having constituent addresses that are mapped to the asymmetric memory components
(840)

↓

The memory controller accesses data associated with the virtual address from the first physical addresses within the symmetric memory components in response to identifying at least one virtual address from within the first subset of virtual addresses for the data structure that is mapped to the symmetric memory components
(850)

↓

The memory controller accesses data associated with the virtual addresses from the second physical addresses within the asymmetric memory components in response to identifying at least one virtual address from within the second subset of virtual addresses for the data structure that is mapped to the asymmetric memory component
(860)

↓

Application access to the data associated with the symmetric and asymmetric memory components is enabled without providing the application with an indication of whether the data is accessed from the symmetric memory component or the asymmetric memory component
(870)

```
┌─────────────────────────────────────────────────────────────────┐
│ The memory controller receives a command from the database     │
│ application to write an update associated with one or more     │
│ virtual addresses mapped to main memory                         │
│ (1010A)                                                         │
└─────────────────────────────────────────────────────────────────┘
                              ↓
┌─────────────────────────────────────────────────────────────────┐
│ A memory controller configures DRAM and NOR flash components   │
│ to interface with the page table                                │
│ (1020A)                                                         │
└─────────────────────────────────────────────────────────────────┘
                              ↓
┌─────────────────────────────────────────────────────────────────┐
│ The memory controller queries a page table that manages first  │
│ virtual addresses associated with first physical addresses in  │
│ DRAM and second virtual addresses associated with second       │
│ physical addresses within NOR flash                             │
│ (1030A)                                                         │
└─────────────────────────────────────────────────────────────────┘
                              ↓
┌─────────────────────────────────────────────────────────────────┐
│ The memory controller identifies virtual addresses for the     │
│ database having constituent addresses that are mapped to DRAM  │
│ and virtual addresses for the database having constituent      │
│ addresses that are mapped to NOR flash                          │
│ (1040A)                                                         │
└─────────────────────────────────────────────────────────────────┘
                              ↓
┌─────────────────────────────────────────────────────────────────┐
│ The update associated with the virtual address from the first  │
│ physical addresses within DRAM is written                       │
│ (1050A)                                                         │
└─────────────────────────────────────────────────────────────────┘
                              ↓
┌─────────────────────────────────────────────────────────────────┐
│ The update associated with the virtual addresses from the      │
│ second physical addresses within NOR flash also is written     │
│ (1060A)                                                         │
└─────────────────────────────────────────────────────────────────┘
                              ↓
┌─────────────────────────────────────────────────────────────────┐
│ The memory controller writes the update specified by the      │
│ application to the DRAM and NOR flash components without       │
│ providing the database application with an indication of       │
│ whether the data is retrieved from the DRAM or the NOR flash   │
│ (1070A)                                                         │
└─────────────────────────────────────────────────────────────────┘
```

FIG. 10A

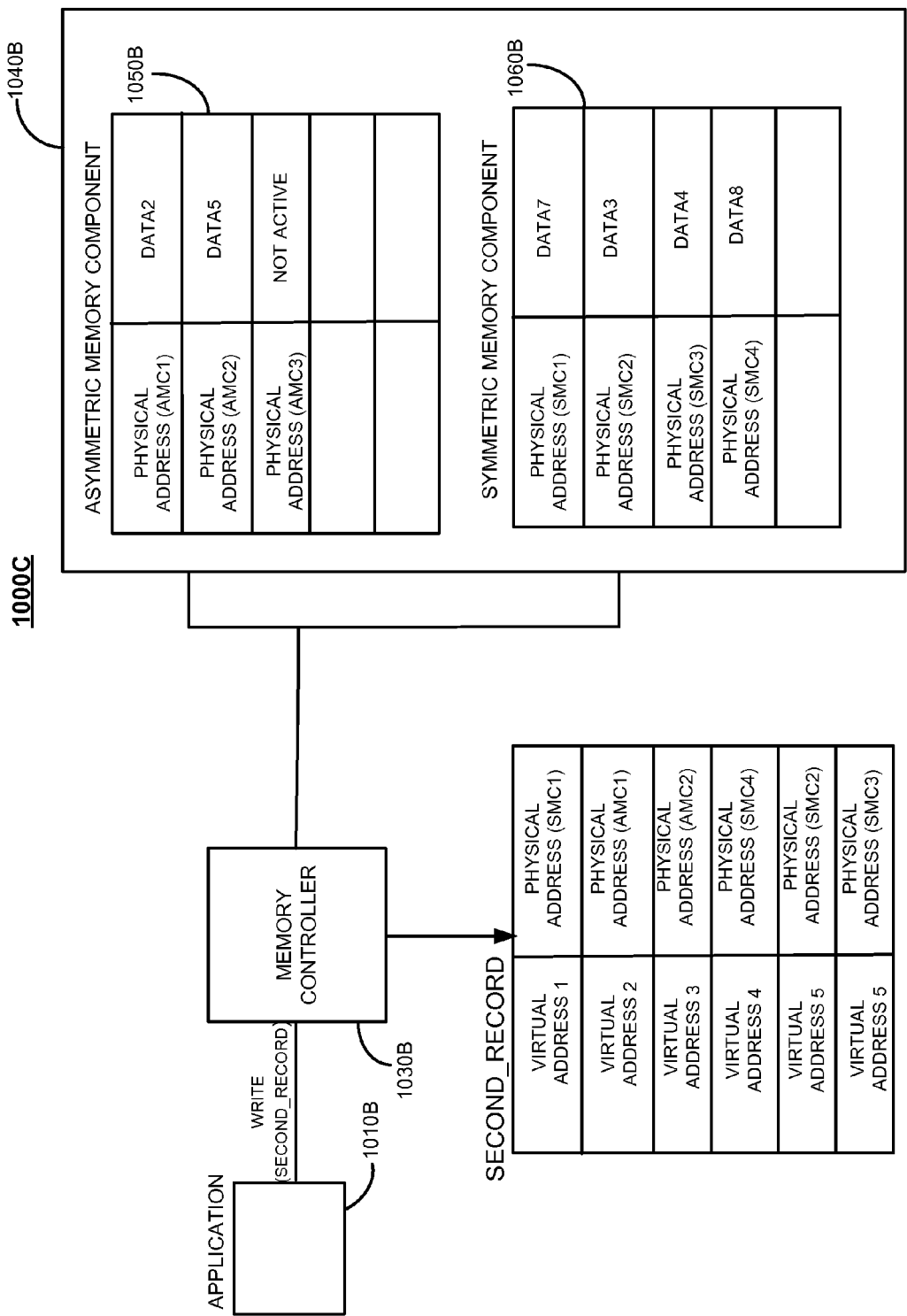

SEAMLESS APPLICATION ACCESS TO HYBRID MAIN MEMORY

CROSS-REFERENCE TO RELATED APPLICATIONS

This application is a continuation (and claims the benefit of priority under 35 USC 120) of U.S. application Ser. No. 11/935,254, filed Nov. 5, 2007, now allowed, which claims the benefit to U.S. Provisional Application No. 60/864,399, entitled, "MEMORY MANAGEMENT OF HYBRID MAIN MEMORY INCLUDING SYMMETRIC AND ASYMMETRIC MEMORY," and filed on Nov. 4, 2006. Both of these prior applications are incorporated by reference in their entirety.

TECHNICAL FIELD

This document relates to providing an application with seamless access to hybrid main memory, which includes symmetric and asymmetric memory components, within a computer system.

BACKGROUND

Applications use memory to store data. For example, a search application may store a search index in main memory. The search application may use the search index for comparison with a search query to identify results. The search application reads and writes to main memory during one or more times in the search process.

SUMMARY

In one aspect, a data structure is accessed that has been stored as two portions accessible concurrently over a time period larger than that represented by a single access within symmetric and asymmetric memory components of main memory, respectively. The symmetric memory components are each configured to enable random access write operations in which an address within a block of the symmetric memory component is written without affecting the availability of other addresses within the block of the symmetric memory component. The asymmetric memory components are each configured to enable block write operations in which a write to an address within a block of one of the asymmetric memory components affects the availability of other addresses within the block of the asymmetric memory component. A command from an application is received to access a data structure associated with one or more virtual addresses mapped to main memory. Symmetric memory components of the main memory and asymmetric memory components of the main memory are configured to interface with a memory table controller. Based on the virtual addresses associated with the data structure and from within the memory table controller, a memory table that manages first virtual addresses associated with first physical addresses in symmetric memory components and second virtual addresses associated with second physical addresses within asymmetric memory components is queried. Based on results of the query of the memory table, a first subset of the virtual addresses for the data structure having constituent addresses that are mapped to the symmetric memory components and a second subset of the virtual addresses for the data structure having constituent addresses that are mapped to the asymmetric memory components are identified. In response to identifying at least one virtual address from within the first subset of virtual addresses for the data structure that is mapped to the symmetric memory components, data associated with the virtual address from the first physical addresses within the symmetric memory components is accessed. In response to identifying at least one virtual address from within the second subset of virtual addresses for the data structure that is mapped to the asymmetric memory component, data associated with the virtual addresses from the second physical addresses within the asymmetric memory components is accessed. The data associated with the symmetric and asymmetric memory components by the application is accessed without providing the application with an indication of whether the data is accessed within the symmetric memory component or the asymmetric memory component.

Implementations may include one or more of the following features. For example, the symmetric memory component may include dynamic random access memory (DRAM) and the asymmetric memory component may include NOR flash. The system may receive a command from an application to access a data structure associated with one or more virtual addresses mapped to main memory that includes DRAM and NOR flash and configure the DRAM and the NOR flash of the main memory to interface with a memory table controller. Based on the virtual addresses associated with the data structure and from within the memory table controller, a memory table that manages first virtual addresses associated with first physical addresses in the DRAM and second virtual addresses associated with second physical addresses within the NOR flash is queried. Based on results of the query of the memory table, a first subset of the virtual addresses for the data structure having constituent addresses that are mapped to the DRAM and a second subset of the virtual addresses for the data structure having constituent addresses that are mapped to the NOR flash are identified. Data associated with the virtual address from the first physical addresses within the DRAM is accessed in response to identifying at least one virtual address from within the first subset of virtual addresses for the data structure that is mapped to the DRAM.

Data associated with the virtual addresses from the second physical addresses within the NOR flash in response is accessed to identifying at least one virtual address from within the second subset of virtual addresses for the data structure that is mapped to the NOR flash, and the data read from the symmetric and asymmetric memory components to the application is accessed without providing the application with an indication of whether the data is retrieved from the DRAM or the NOR flash.

The asymmetric memory component has asymmetric access characteristics that may include (1) the asymmetric memory component performs read operations at a first rate and performs write operations at a second rate that is more than an order of magnitude different than the first rate, (2) the asymmetric memory component uses an asymmetric memory access protocol, and (3) the asymmetric memory component includes non-volatile storage capability. The symmetric memory component has symmetric access characteristics that may include (1) the symmetric memory component performs read operations at a rate that that differs by less than an order of magnitude from a rate at which write operations are performed, (2) the symmetric memory component uses a symmetric memory access protocol, and (3) the symmetric memory component includes a volatile storage capability.

Accessing the data associated with the symmetric and asymmetric memory components to the application may include providing the data in a read operation from the symmetric and asymmetric memory components to the application without basing activities of the application upon knowledge by the application of whether the data is stored in the asymmetric memory component. Accessing the data associated with the symmetric and asymmetric memory components to the application may include writing the data to the symmetric and asymmetric memory components to the application without basing activities of the application upon knowledge by the application of whether the data is stored in the asymmetric memory component. Writing the data to the symmetric and asymmetric memory components to the application without basing activities of the application upon knowledge by the application of whether the data is stored in the asymmetric memory component may include receiving a CPU store instruction, determining, using the memory table, that a portion of the data structure resides in the asymmetric memory component, receiving a physical address associated with the symmetric memory component, modifying the CPU store instruction to use the physical address associated with the symmetric memory component, and executing the CPU store instruction the physical address associated with the symmetric memory component to store the portion in the symmetric memory component.

Identifying the first subset of the virtual addresses for the data structure having constituent addresses that are mapped to the symmetric memory component may include identifying a range of virtual addresses specified with a starting virtual address and an ending virtual address. Identifying the first subset of the virtual addresses for the data structure having constituent addresses that are mapped to the symmetric memory component may include identifying a block.

Identifying the first subset of the virtual addresses for the data structure having constituent addresses that are mapped to the symmetric memory component may include identifying a first collection of discontinuous virtual addresses that map to the symmetric memory component, the discontinuous virtual addresses having unused virtual addresses within a range of virtual addresses. Identifying the second subset of the virtual addresses for the data structure having constituent addresses that are mapped to the asymmetric memory component may include identifying a range of virtual addresses specified with a starting virtual address and an ending virtual address. Identifying the second subset of the virtual addresses for the data structure having constituent addresses that are mapped to the asymmetric memory component may include identifying a block. Identifying the second subset of the virtual addresses for the data structure having constituent addresses that are mapped to the asymmetric memory component may include identifying a second collection of discontinuous virtual addresses that map to the asymmetric memory component, the discontinuous virtual addresses having unused virtual addresses within a range of virtual addresses.

A first collection of discontinuous virtual addresses may be identified that map to the symmetric memory component that are interspersed with the second collection of the discontinuous virtual addresses and the first collection and the second collection may be accessed in order to provide the data read from the symmetric and asymmetric memory components to the application.

Implementations may include one or more of the following features. For example, providing the data to the application may include providing the data to the application without requiring the application to operate differently based on whether the data is stored in the asymmetric memory component. Providing the data to the application may include providing the data to the application without revealing to the application whether the data is stored in the asymmetric memory component.

In another aspect, an instance of data stored within one or more symmetric memory components of main memory with an instance of data stored within one or more asymmetric memory components is accessed. The symmetric memory components are each configured to enable random access write operations in which an address within a block of the symmetric memory component is written without affecting the availability of other addresses within the block of the symmetric memory component. The asymmetric memory components are each configured to enable block write operations in which an address within a block of one of the asymmetric memory components affects the availability of other addresses within the block of the asymmetric memory component, the method comprising. A command from an application is received to read data associated with a virtual address mapped to main memory. Data from the command to be read in accordance with the received command is gleaned and the virtual address that is mapped to main memory for the data which is to be read in accordance with the received command is determined. Symmetric memory components of the main memory and asymmetric memory components of the main memory are configured to interface with a memory table controller.

Based on the determined virtual address and from within the memory table controller, a memory table is queried that manages first virtual addresses associated with first physical addresses in symmetric memory components and second virtual addresses associated with second physical addresses within asymmetric memory components. Based on results of querying the memory table with the determined virtual address, it is determined whether the virtual address with which the data in the read command is associated is mapped in a symmetric memory component or an asymmetric memory component. The data associated with the virtual address from one of the first physical addresses is read in response to determining that the virtual address is mapped to a symmetric memory component. The data associated with the virtual address from one of the second physical addresses is read in response to determining that the virtual address is mapped to an asymmetric memory component. The data is provided to the application without an indication of whether the data is retrieved from the symmetric memory component or the asymmetric memory component.

Providing the data to the application may include providing the data to the application without requiring the application to operate differently based on whether the data is stored in the asymmetric memory component. Providing the data to the application may include providing the data to the application without revealing to the application whether the data is stored in the asymmetric memory component.

In yet another aspect, an application access request that implicates data stored within symmetric and asymmetric memory components of main memory is resolved. The symmetric memory components are each configured to enable random access write operations in which an address within a block of the symmetric memory component is written without affecting the availability of other addresses within the block of the symmetric memory component. The asymmetric memory components are each configured to enable block write operations in which an address within a block of one of the asymmetric memory components affects the availability of other addresses within the block of the asymmetric memory component. A command from an application is received to access data to be used in performing an application function. It is determined that the data is associated with virtual addresses with which the data in the read command is associated by accessing a memory table controller that interfaces symmetric memory components of the main memory and asymmetric memory components of the main memory.

The memory table controller is leveraged to query a memory table that manages first virtual addresses associated with first physical addresses in symmetric memory components and second virtual addresses associated with second physical addresses within asymmetric memory components. Based on the memory table, it is determined whether the virtual addresses with which the data in the read command is associated are mapped to a symmetric memory component of the main memory or an asymmetric memory component of the main memory. The data associated with the corresponding virtual addresses using at least one of the first physical addresses is accessed in response to determining that one or more of the virtual addresses with which the data in the read command is associated is mapped to a corresponding symmetric memory component.

The data associated with the corresponding virtual addresses using at least one of the second physical addresses is accessed in response to determining that one or more of the virtual addresses with which the data in the read command is associated is mapped to a corresponding asymmetric memory component. The data associated with the first virtual address from within the corresponding symmetric memory component and accessing data associated with the second virtual address from within the corresponding asymmetric memory component is accessed in response to determining that at least a first of the virtual addresses with which the data in the read command is associated is mapped to a corresponding symmetric memory component and at least a second of the virtual addresses is mapped to a corresponding asymmetric memory component. The data accessed is provided, including data from each of the symmetric and asymmetric memory components when the virtual addresses are determined to map to corresponding symmetric and corresponding asymmetric memory components, to the application in response to the command from the application to access data to be used in performing the application function.

DESCRIPTION OF DRAWINGS

FIG. 8 is a flow chart of a process for accessing a data structure that is stored in a distributed manner, as two portions accessible concurrently, respectively within symmetric and asymmetric memory components of main memory.

FIG. 10A is a flow chart of a process by which a database application writes updates or records to the database that has been stored as two portions accessible concurrently over a time period larger than that represented by a single access within DRAM and NOR flash.

FIGS. 10B-10C are block diagrams of a configuration of a computer system in which an application writes a data structure that has been stored as two portions accessible concurrently over a time period larger than that represented by a single access within symmetric and asymmetric memory components of main memory at two different instances in time.

DETAILED DESCRIPTION

Figure 1:
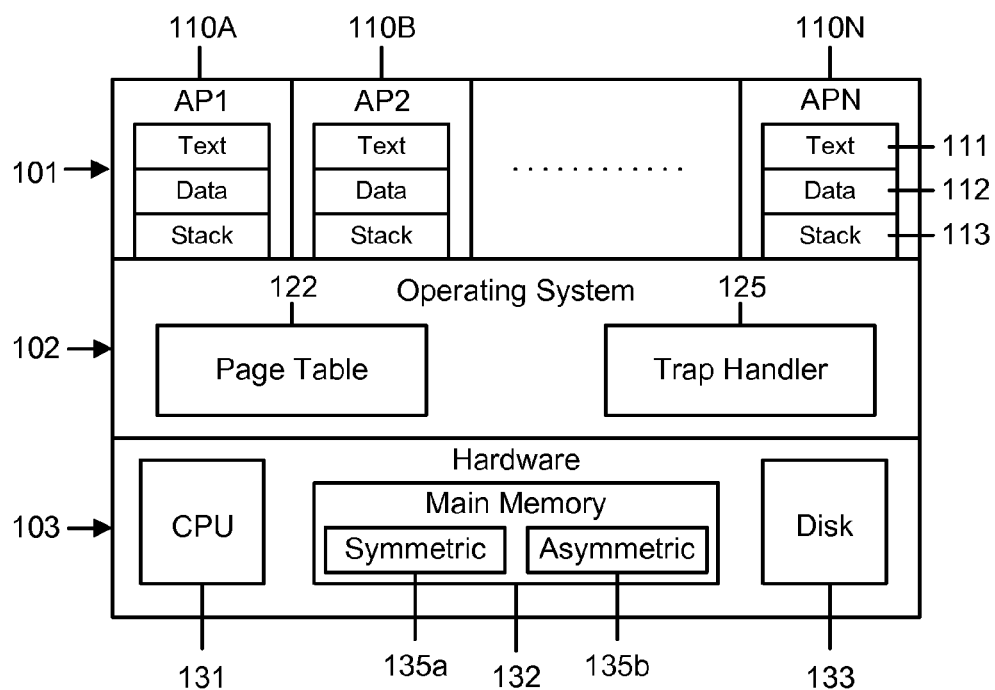
FIG. 1 illustrates an example of a first layer model of a computing system.

The detailed description is divided into four sections. Section A provides a brief description of method and mechanisms. Section B provides a description of the hardware, software, and system context. Section C provides a description of read movement and write movement. Section D provides a discussion of operations performed and additional configurations.

A. Brief Description of Method/Mechanism

An application on a computer system accesses a specialized memory structure and uses the specialized memory structure as main memory. More precisely, an application may read and write application data to the specialized memory structure. The memory structure is "specialized" in that the memory structure includes symmetric memory components and asymmetric memory components. An example of a symmetric memory component used in the specialized memory structure includes DRAM ("Dynamic Random Access Memory"), and an example of the asymmetric memory component includes NOR flash. In one configuration, the specialized memory structure is packaged as DRAM and NOR flash components within a DIMM ("Dual Inline Memory Module") module. The DIMM modules are configured and inserted into DIMM sockets, and, as a result, the CPU may be configured to treat the specialized memory structure with DRAM and NOR flash as main memory, able to support application read and write commands.

The labels "symmetric" and "asymmetric" that are herein used to modify the term memory component refer to the access characteristics of the underlying memory system. For example, symmetric memory components, such as DRAM, support random access read and write operations, which may be performed in comparable access times, without disrupting application performance as a write is performed. In addition, performing a random access write operation to a physical address in the symmetric memory component does not affect the ability to access perform write operations to physical addresses that are proximate to the symmetric memory component.

In contrast, asymmetric memory components, such as NOR flash, do not support random access write operations. In order to write data to a physical address in an asymmetric memory component, a block write operation is performed. Performing a block write involves writing to a single block in an asymmetric memory component, which impacts several aspects of a computer system. First, a block write may create a disruption region that impacts several blocks. A disruption region generally refers to a region whose access behavior is impacted (often undesirably) during a write to an asymmetric memory component. The access behavior may include corrupt data, access delays, and/or an inability to have confidence in results that are returned during a read operation (even if the results are correct and not delayed). And, although the data to be written may itself affect only a portion of the disruption region, a block write can affect a larger amount of storage within the disruption region. To illustrate, writing a 2 Mbyte block during a block write may affect a 2 GByte disruption region in a 16 GByte memory component. Thus, even though the specialized memory structure may be provided with a physical interface to act as main memory, additional configuration is useful in shielding an application from the consequences of undesired access behaviors.

A memory controller is configured to manage the manner in which such a specialized memory structure is accessed. Because symmetric memory components, like DRAM, do not experience adverse consequences associated with performing write operations that asymmetric memory components experience, the memory controller is configured to load and maintain write-intensive data in symmetric memory components. Conversely, because asymmetric memory components demonstrate read access characteristics similar to symmetric memory components, read-intensive data is loaded and maintained in symmetric memory components.

The computer system may be configured to shield an application from the underlying manner in which the hybrid memory system operates. In one particular example, the memory controller is configured to present a normalized interface to an application, reconfiguring communications exchanged through the normalized interface to enable and inspire the special operations required of the hybrid memory system.

In another example, a server with a hybrid memory system hosts a data mining application that imposes severe demands on memory resources. In order to facilitate computationally-efficient data mining, the data mining application organizes atomic data into a large and complex data structure designed to facilitate identification of relationships between different sets of data. The large and complex data structure is stored as two portions accessible concurrently over a time period larger than that represented by a single access within symmetric and asymmetric memory components of main memory. Put differently, at least one portion of the complex data structure is stored in DRAM, and at least one portion of the data structure is stored in NOR flash. The DRAM components are each configured to enable random access write operations in which an address within a block of the DRAM is written without affecting the concurrent availability of other addresses within the block of the symmetric memory component. In contrast, the NOR flash components are each configured to enable block write operations in which a block write to the NOR flash affects the availability of other addresses within a bank of NOR flash beyond the page being written.

The memory controller receives a command from the data mining application to read the complex data structure associated with one or more virtual addresses mapped to main memory, and configures DRAM and NOR flash components in the main memory to interface with a memory table controller. Based on the virtual addresses associated with the complex data structure and from within the memory table controller, the memory controller queries a memory table that manages first virtual addresses associated with first physical addresses in DRAM and second virtual addresses associated with second physical addresses within NOR flash. The memory controller identifies, based on results of the query of the memory table, a first subset of the virtual addresses for the data structure having constituent addresses that are mapped to the DRAM and a second subset of the virtual addresses for the data structure having constituent addresses that are mapped to the NOR flash.

In response to identifying at least one virtual address from within the first subset of virtual addresses for the data structure that is mapped to the DRAM the memory controller reads data that is associated with the virtual address from the first physical addresses within the DRAM. In response to identifying at least one virtual address from within the second subset of virtual addresses for the data structure that is mapped to the NOR flash, the memory controller reads data that is associated with the virtual addresses from the second physical addresses within the NOR flash. The memory controller then provides the data read from the DRAM and NOR flash to the data mining application without providing the application with an indication of whether the data is retrieved from the DRAM or the NOR flash.

As can be appreciated through this example, in at least one implementation, it is possible for an application that interfaces with the computer system configured in this manner to access the data structure without providing the application with an indication of whether the data is accessed within the symmetric memory component or the asymmetric memory component.

B. Description of Hardware, Software, and System Context

Referring now to FIG. 1, an example of a first layer model 100 of a computing system is illustrated. The first layer model 100 includes an application (AP) layer 101, an operating system (OS) layer 102, and a hardware (HW) layer 103. The AP layer 100 includes one or more application processes AP1 110A through APN 110N.

Examples of application processes may include a web browsing or hosting program, a word processing program, a search program, a data mining and analytical program, or other type of application configured to execute on the AP layer. Application programs may be stored on a disk and remain in a passive state until a user chooses to execute an application program where it is loaded into memory as an application process.

Although other application processes may be employed, each application process (AP1 110A to APN 110N) loaded into memory may be allocated space in the main memory including a text region 111, a data region 112, and a stack region 113. The text region 111 may include executable instructions associated with the application program. The data region 112 may include data associated with the application. The data may be dynamic and/or static. The stack region 113 may include a state of a function or procedure of the application program and its activation frame.

The hardware layer 103 may include a central processing unit or processor 131, a main memory 132, and a hard disk storage 133. The main memory 132 may include symmetric memory 135a (e.g., DRAM) and asymmetric memory 135b

(e.g., NOR flash memory). In one implementation, the asymmetric memory component 135b is NOR flash electrically erasable programmable read only memory (EEPROM).

The operating system layer 102 resides between the HW layer 103 and the AP layer 101. The operating system layer 102 may be a modified operating system, such as Microsoft Windows, Linux, or another Unix variant, configured to manage hardware included in the HW layer 103 of the computer system. The operating system may include a flash memory trap handler 125 configured to manage the asymmetric memory 135b in the main memory 132. The flash memory trap handler 125 may be configured to reduce the number of write accesses to the asymmetric memory 135b.

Multiple processes may place demands on main memory 132 in a computer system. The operating system may respond to those demands for main memory 132 by managing how physical memory is allocated to a virtual address space of each process executing on the AP layer 101. In some implementations, the operating system may use virtual memory management techniques to efficiently manage available physical memory resources and to indicate to the application processes that there is more memory capacity available for use over and beyond the physical memory capacity in main memory 132. In these implementations, the operating system 102 maintains a page table 122 to map virtual addresses in application processes to physical addresses in main memory 132. The hard disk storage 133 may be used to provide additional memory capacity for an application process.

Virtual memory management techniques may be configured to estimate the immediate memory needs in a specified application and allocate physical memory responsive to the specified application's needs, as opposed to other memory requirements that can be deferred and allocated to hard disk storage 133. A contiguous addressable range of memory, referred to as a page, may be swapped between physical main memory 132 and hard disk storage 133 as its need for immediate use increases or decreases.

Figure 2:
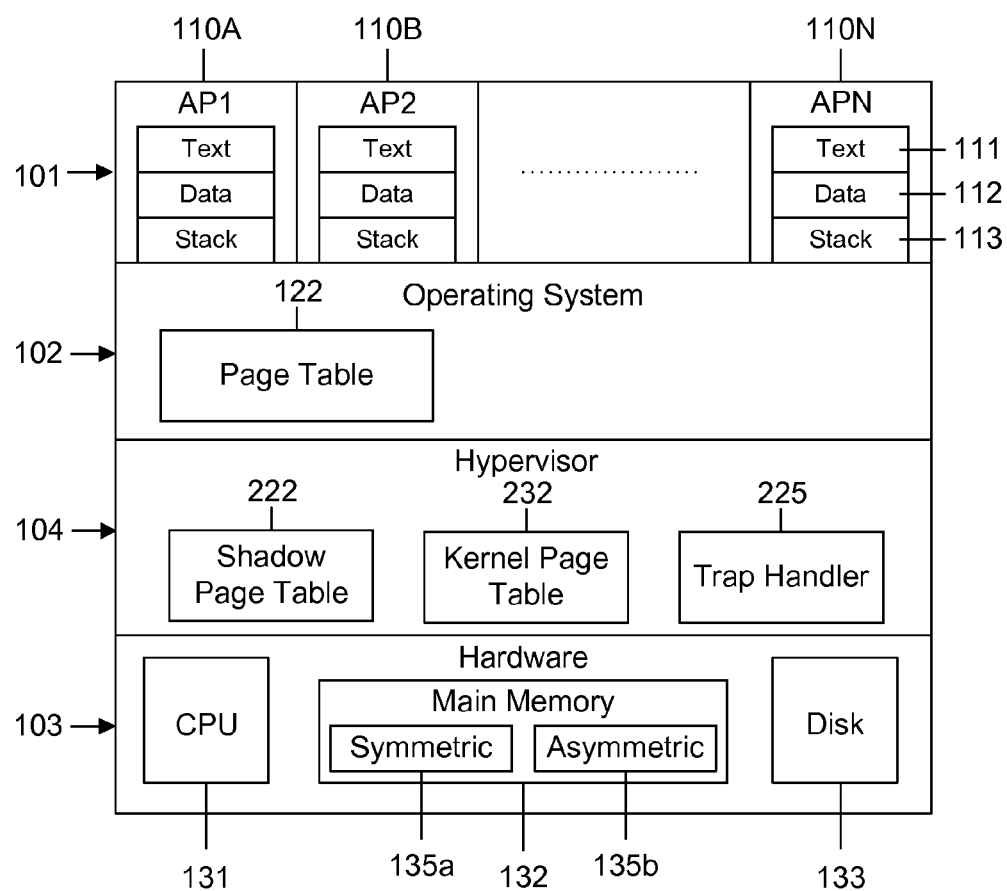
FIG. 2 illustrates an example of a second layer model of a computing system.

Referring now to FIG. 2, an example of a second layer model 200 of a computing system is illustrated. The second layer model 200 includes an application (AP) layer 101, an operating system (OS) layer including one or more host operating systems 102, a hypervisor layer 104, and a hardware (HW) layer 103.

The second layer model 200 differs from the first layer model 100 in that the hypervisor layer 104 is included between the operating system layer 102 and the hardware layer 103, and, instead of the operating system being modified, the hypervisor in the hypervisor layer 104 includes a write access hypervisor trap handler 225 configured to manage the asymmetric memory 135b. The write access hypervisor trap handler 225 may be configured to reduce the number of write accesses to the asymmetric memory component 135b in the main memory 132.

A hypervisor in a computer system may be a layer of hardware, software, firmware, or combinations thereof operating between the operating system layer and the hardware layer that allows one or more host operating systems (or portions of an operating system) to run, unmodified, on a host computer at the same time.

Each of the one or more host operating systems 102 may maintain one or more page tables 122 to map virtual addresses in application processes to physical addresses in main memory 135. The hypervisor layer 104 may maintain one or more respective shadow page tables 222 for each host operating system to map virtual addresses of the application processes to physical addresses in main memory 135.

Figure 2A:
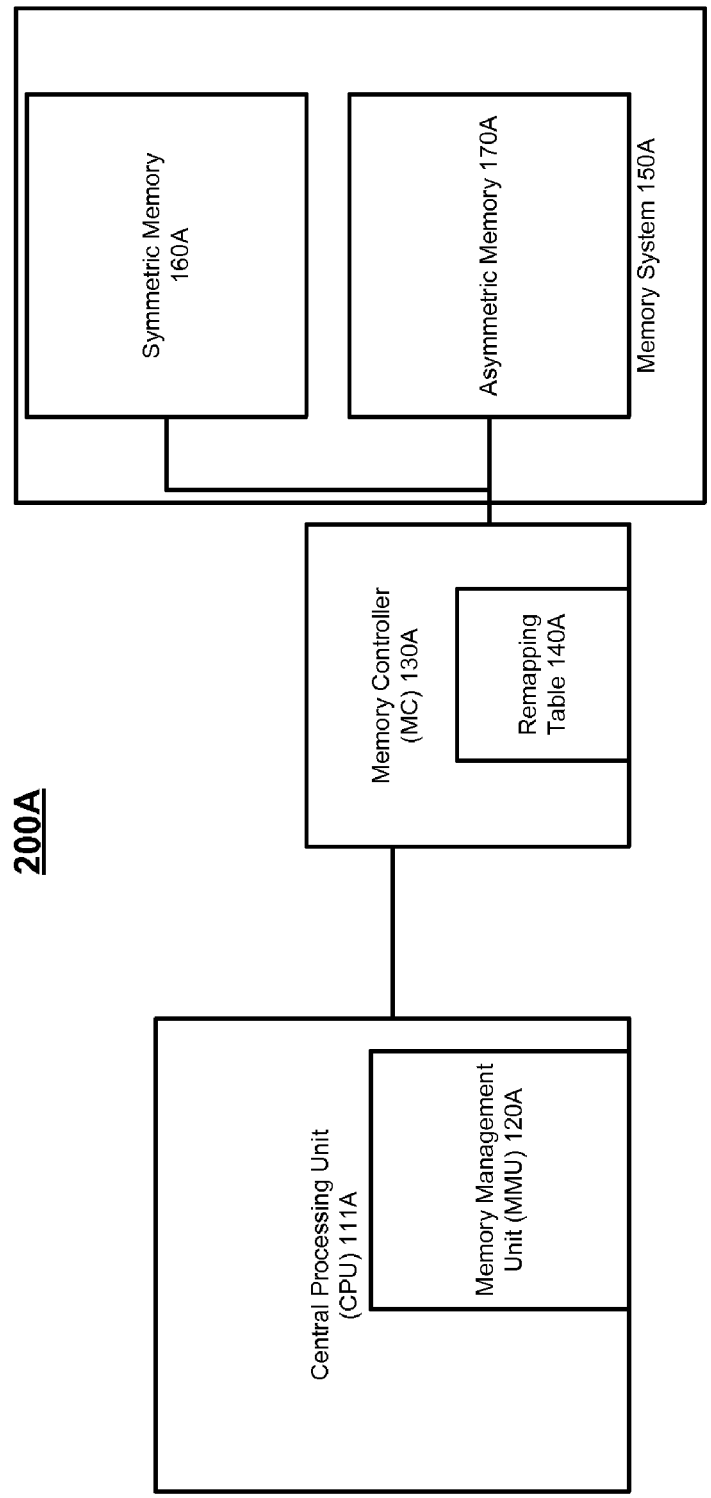
FIG. 2A is a block diagram of a system with a CPU that interfaces with a memory system through a memory controller.

FIG. 2A is a block diagram of a system 100A with a CPU 111A that interfaces with a memory system 150A through a memory controller 130A. More precisely, the memory controller 130A is positioned, oriented, and configured to enable it to be leveraged in processing read and write requests from the memory management unit 120A to the memory system 150A while shielding the CPU 111A from challenges resulting from particular access characteristics associated with asymmetric memory 170A.

The CPU 111A includes logic configured to implement one or more processing operations. Examples of a CPU 111A may include x86-based processors from Intel Inc. and Advanced Micro Devices Inc. (AMD), and/or ARM (TM) processors. The CPU 111A may include one or more processor cores.

Generally, each CPU 111A interfaces with an operating system. The operating system, in turn, may interface with one or more applications. These applications may include a search engine, business analytics, data mining, and database operations. Each of these applications may be compiled (or interpreted) into different machine-level instructions for execution on the CPU 111A. Although only one CPU 111A is shown, multiple CPUs may be used. Each CPU 111A supports an instruction set with a variety of instructions. These instructions may include, among other operations, register shifts, arithmetic operations, and memory operations. Examples of the memory operations may include random access read and write operations and I/O read and write instructions that can be used to initiate block read and write operations.

As shown, the CPU 111A includes a memory management unit 120A. Generally, the memory management unit 120A is configured to manage a physical address space for the CPU 111A. As the CPU 111A is executing a program, the CPU 111A may request to read data from a particular address and write data to a particular address. More precisely, the memory management unit 120A may be configured to receive a virtual address from the CPU 111A and translate the virtual address into a physical address (i.e., a memory management unit-specified physical address). In the case of a read, the CPU 111A may be configured to consult the memory management unit 120A to obtain the physical address associated with the virtual address specified by the CPU 111A. The memory management unit 120A (or some other entity) in the CPU 111A is instructed to retrieve data from the MMU-specified physical address. Other systems (e.g., the memory controller 130) may, in turn, process the memory management unit-specified physical address as an additional type of virtual address. In another configuration where a translation element of an MMU is separated out from the portion of the CPU that is responsible for interacting with the memory subsystem, the MMU may be configured to obtain the physical address associated with the virtual address. The MMU (or another entity in the CPU) then may be instructed to retrieve data from the MMU-specified physical address.

The memory controller 130A is logically oriented as an intermediary system to enable the CPU 111A to interface with a memory system 150A. More precisely, the memory controller 130A is a system configured to receive read and write instructions with a memory management unit-specified physical address from the memory management unit 120, lookup a memory controller-specified physical address associated with the memory management unit-specified physical address, and perform the requested read and/or write instruction on the block(s) of physical memory corresponding to the memory controller-specified physical address.

The memory controller 130A includes logic (hardware and/or software) configured to manage the placement of and movement of data within a memory system 150A. The memory controller 130A may be configured to dynamically process instructions based on a determination of whether the data and/or address is associated with symmetric memory or asymmetric memory. Similarly, the memory controller 130A may be configured to process read instructions in a first way, and process write instructions in a second way. For example, the memory controller 130A may be configured to permit read operations from the memory management unit that specify a particular address to leverage or otherwise operate on a first address within asymmetric memory, while concurrently processing write operations from the memory management unit that specify a particular address to leverage or otherwise operate on a second address within symmetric memory.

The memory controller 130A includes a physical interface to the memory system 150A. The physical interface is configured to automatically exchange physical address information as the memory controller 130A interfaces with the memory system 150A.

The memory controller 130A includes a remapping table 140A that stores an association between a memory management unit-specified physical address and a memory controller-specified physical address. The remapping table 140A may associate multiple memory controller-specified physical addresses with a memory management unit-specified physical address. For example, the remapping table 140A may be configured to indicate that writes to the disruption region should be directed to a "new" physical address range for the memory management unit, while reads from the disruption region should be directed to the "old" physical address range. Moreover, the remapping table 140A may indicate that a particular memory management unit-specified physical address is associated with a disruption region. For example, high-order address bits and some low-order bits in the MMU-supplied physical address may be analyzed to indicate which bank is being used. Alternatively, the memory controller may include logic (or include another column in a software table) that identifies the bank being used. Configuring the memory controller to have a bank identifier readily available may be used to reduce the processing burden of identifying a bank, for example, when performing write operations. The memory system 150A may include symmetric memory 160A and asymmetric memory 170A. The memory system 150A may be packaged as one or more DIMMs (Dual Inline Memory Modules) and configured to support DIMM protocols, signaling, interconnects, and physical interfaces.

The symmetric memory 160A includes one or more memory systems where read characteristics have similar properties to the write characteristics. Examples of symmetric memory include DRAM, and other random access memory technologies.

The asymmetric memory 170A includes one or more memory systems where read characteristics and write characteristics are dissimilar. For example, some types of asymmetric memory have write latencies that are orders of magnitude greater than the read latencies. Examples of asymmetric memory may include NOR flash. With some types of asymmetric memory, an interface is used to (among other things) require an entire region of content to be rendered inaccessible to read requests whenever any constituent block of the region is written, for example, using an I/O block write, instead of a smaller, random access write to the specific update location.

In configurations where the memory system 150A resides in DIMM packaging, the DIMM may be configured to dynamically process read and write instructions. For example, in a read mode, one or more DIMMs may be configured to receive instructions to access content residing at a particular physical address, and provide requested content to the processor through the memory controller. Generally, in a write mode, the DIMM is configured to receive data to be written with a physical address. Depending on whether the physical address represents flash or DRAM, the data may be written in a random access manner (e.g., a word or byte) or in a block (e.g., a 4 Megabyte or a 4 kilobyte block). In one configuration, the DIMM is entirely made up of one type of memory (e.g., DRAM or NOR flash). In another implementation, the DIMM includes a hybrid of both DRAM and flash and relies on an internal or external memory controller to perform the different operations required to implement a hybrid memory system. And, although one or more configurations were described where a hybrid and/or dedicated configuration were used, a different configuration may be used.

C. Description of Read Movement and Write Movement

FIGS. 1, 2, and 2A illustrate different components in a server system that may be configured to interface with and control aspects of a memory system with symmetric and asymmetric components. In one configuration, a hybrid (e.g., symmetric/asymmetric volatile/non-volatile, DRAM/Flash, etc.) main memory system may be used by modifying application programs to decide which portions of its text (e.g., code) and data areas to map to symmetric regions and asymmetric regions in the main memory. The mapping by the application program may be modified to reflect characteristics of different types of memory. For example, a memory controller may be configured to selectively load data to memory in response to a relatively slow latency seen with a type of flash memory region accesses, as well as other properties of the type of flash memory device, such as the limited write lifetime, limited number of reads between writes, and the relatively longer latency for erase and write operations. Modifying application programs to support a hybrid main memory including DRAM memory and flash memory may pose one or more of the following or other challenges.

For example, restructuring application programs to be aware of and interface with a hybrid memory system may be easier to implement if the modification to the structure of the application is limited. In this example, application programs that rely on memory-mapped input/output ("I/O") functionality, similar to that provided by a memory map ("mmap") system call, may reduce the degree of restructuring that is required to support a hybrid main memory. Existing parameters and arguments supplied with a mmap call may be used to make a determination about whether or not a certain I/O object should reside in the asymmetric memory region. However, applications that are associated with a more dynamic use of memory resources, for example, to implement an application-specific cache for I/O objects, may require a more extensive revision to the memory commands in order to support a hybrid main memory. In one example, a program associated with a more dynamic use of memory resources may be specifically configured to operate with certain symmetric (e.g., DRAM) memory characteristics, and thus, may have read/write access behaviors that are not well suited to asymmetric memory.

In some implementations, unmodified application programs (e.g., a program encoded in binary form) may be used with a hybrid DRAM/flash memory subsystem. In these implementations, the portion of the application code and data that are accessed in a read-only fashion and/or operations that are relatively tolerant of increased access latency, may be migrated over time in an adaptive fashion from DRAM memory regions into the flash memory regions in the main memory.

Figure 3A:
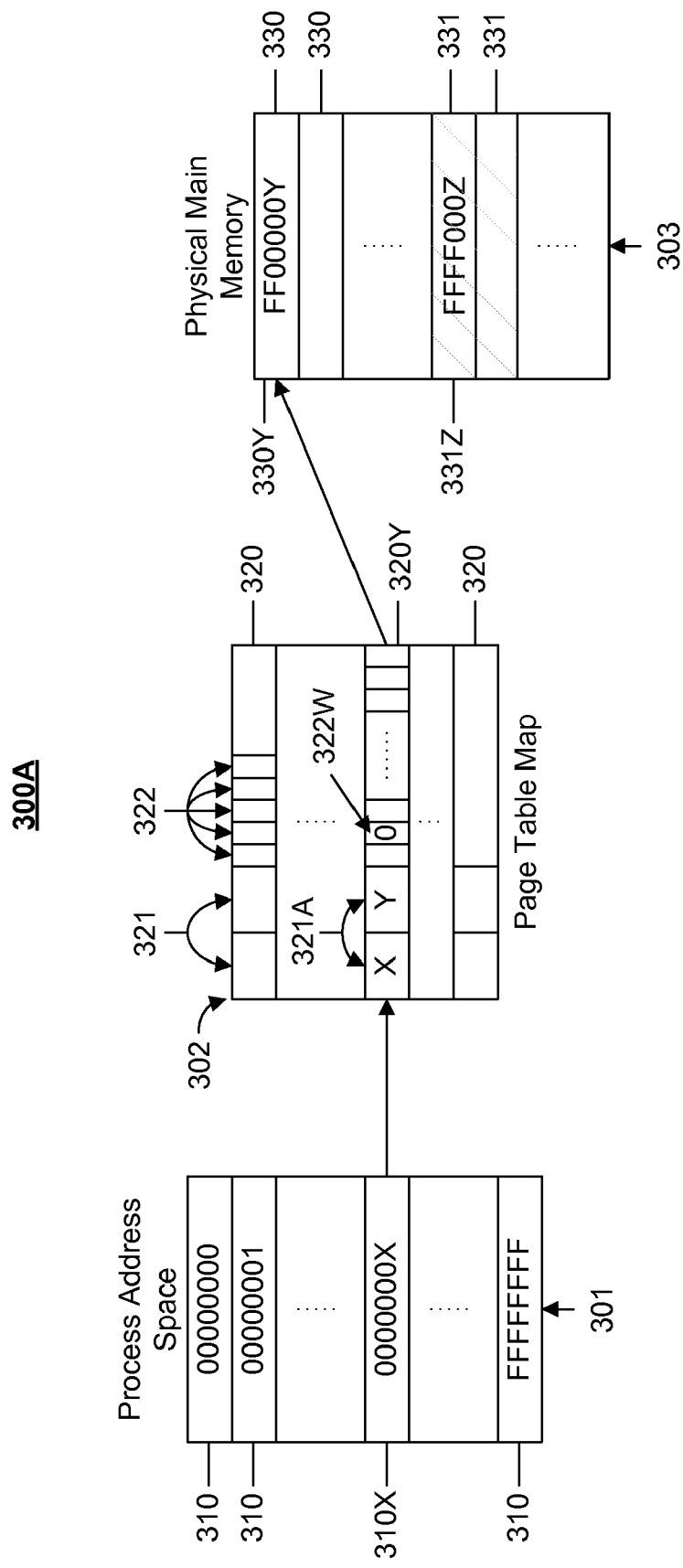
FIGS. 3A-3B are diagrams illustrating an example of mapping a virtual address space of an application running on a processor into a physical address space of a hybrid main memory using a memory table map.

Referring now to FIG. 3A, a virtual address space or processor address space 301 may be mapped into a physical hybrid main memory 303 by a page table map 302. That is, a plurality of pages 310 associated with virtual addresses may be mapped to physical addresses of a plurality of physical pages in the hybrid main memory 303. The page table map 302 may include one or more page table entries (PTE) or slots (320A-320N) to map the virtual page address to the physical page address. The page table map 302 may be in a structure called the page table and may be maintained by the operating system. Page table map and page table may be referenced interchangeably.

Figure 5A:
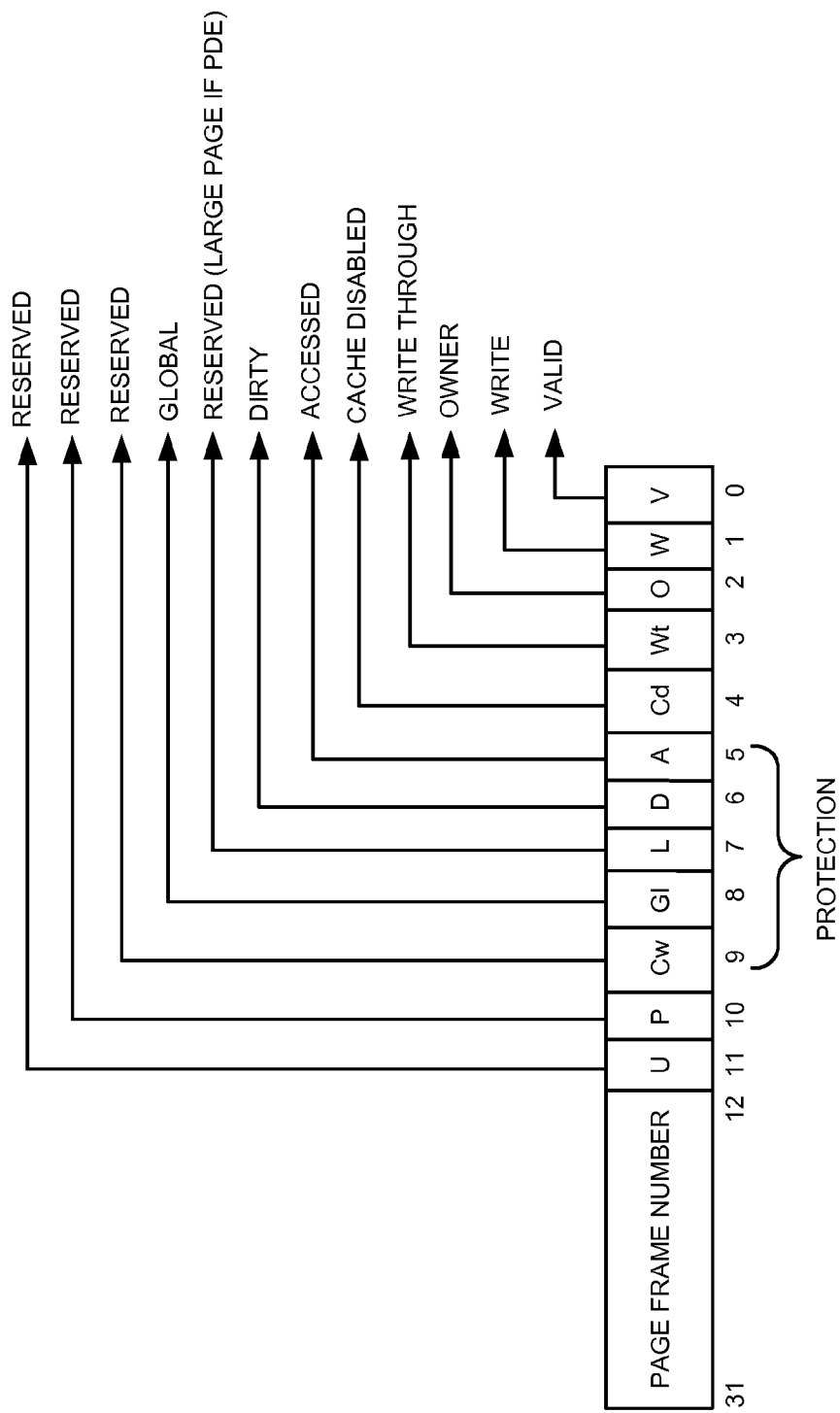
FIG. 5A is a diagram illustrating the bits and bit fields in a page table entry in a page table, which is illustrated as having 32 bits.

Each slot 320 in the page table map 302 may include a page frame number (PFN) 321 and one or more protection bits 322, one of which may be a write protection bit 322W that may be used to provide/signal page protection. The write protection bit controls whether CPU-initiated writes are allowed against virtual page locations corresponding to the page table entry. When set, writes are disallowed, resulting in an operating system or hypervisor level trap that enables software to exercise control over whether and how the write operation is performed. FIG. 5A shows other bits and bit fields that may be included in each slot 320 of an exemplary thirty-two bit wide PTE of page table map 302. In a 32-bit wide addressing scheme, bits 31-12 identify the page frame number. Bit 11 is reserved and writable on multiprocessor systems. Bits 10 and 9 are reserved. Bit 8 is a global bit, and bit 7 is used to identify whether the page is a large page. Bit 6 is a dirty bit identifier indicating whether the page has been written to. Bit 5 indicates whether the page has been read. Bit 4 indicates that the cache has been disabled, and bit 3 indicates that write through is supported to disable caching of writes to this page so that changes are immediately flushed to disk. Bit 2 indicates whether the user mode can access the page or whether the page is limited to kernel mode access. Bit 1 indicates whether the page is read/write capable or only readable, controlling whether the page is writable. Bit 0 indicates whether the translation maps to a page in physical memory.

Figure 5B:
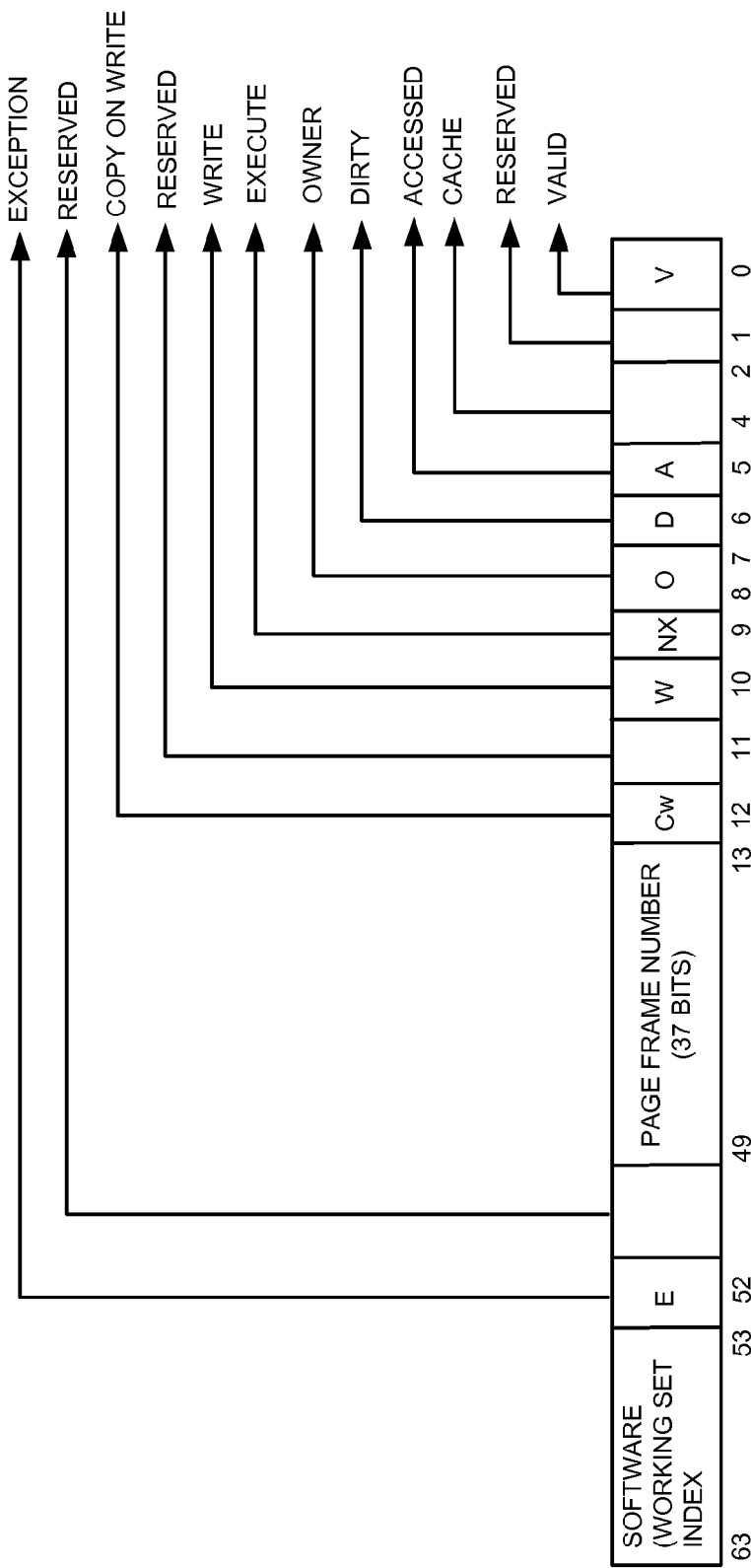
FIG. 5B is a diagram illustrating the bits and bit fields in a sixty-four bit slot or page table entry in a page table.

FIG. 5B is a diagram illustrating the bits and bit fields in a sixty-four bit slot or page table entry in a page table. In a sixty four bit wide addressing scheme, bits 63-53 are software representing a working set index. Bit 52 is used to indicate exceptions, and bits 51 and 50 are reserved. Bits 49-13 represent the page frame number. Bit 12 is used to indicate a copy on writes, and bit 11 is reserved. Bit 10 is used to indicate whether writes are allowed, and bit 9 is used to indicate the execute bit. Bits 8 and 7 indicate owner parameters specifying whether the user mode can access the page or whether the page is limited to kernel mode access. Bit 6 is a dirty bit indicating whether the page has been written to. Bit 5 is an access bit indicating whether the page has been read. Bits 4-2 indicate the cache parameters. Bit 1 is reserved and bit 0 indicates whether the page is valid or not.

In one example, the write protection bit may be set to logical zero to indicate that the associated page is read-only. In another example, the write protection bit may be set to logical one to indicate that the associated page is read-only. In either example, the write protection bit may be changed to indicate that the associated page is read accessible only. Without the write protection bit being appropriately set to protect a page from write access, the page may be both read and write accessible.

In translating a virtual address to a physical address in physical memory, additional translation hierarchy may be used in addition to the page table map 302 to provide additional addressable memory. The hierarchy may include page directories to point to page tables, page directory pointer tables to point to page directories, and a page map level table to point to the page directory pointer tables. However, the page table map 302 may be used to support the hybrid main memory at the lowest level of the address translation hierarchy.

In one initial default configuration, an application may be assigned by the page table map 302 to use DRAM memory pages 330 in the hybrid main memory 303. For example, a virtual page X of addressable memory 310X indexes into, relates to, or points to a slot 320Y in the page table map 302 to translate the virtual address into a physical address that points to a DRAM memory page Y 330Y in one of the DRAM memory regions of the physical hybrid main memory 303. In this example, the write protection bit 322W of the slot 320Y in the page table map 302 is set to zero to indicate that the DRAM memory page 330Y in the physical hybrid main memory 303 is both read and write accessible.

Figure 3B:
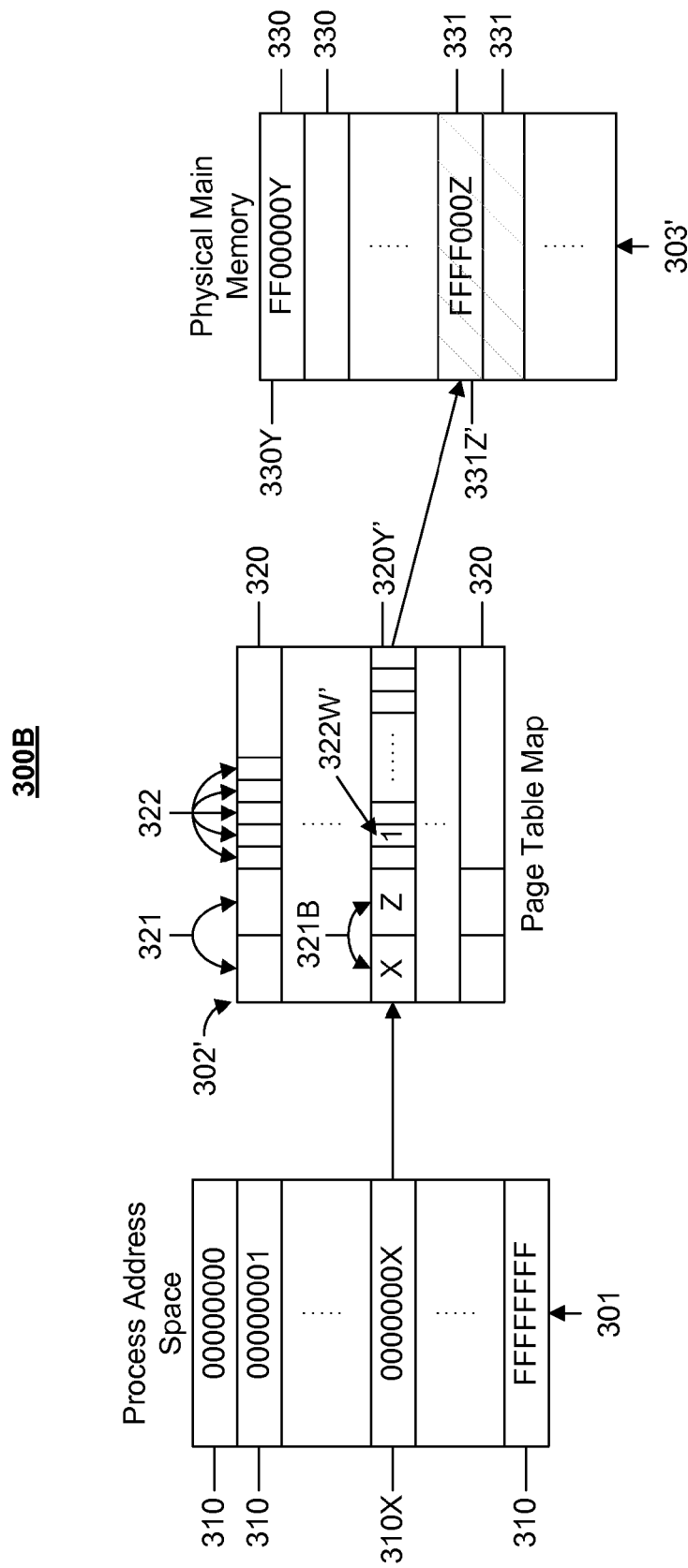

Referring now to FIG. 3B, the information in the DRAM memory page Y 330Y has been copied into the flash memory page Z 331Z', for example. In this example, the page frame number in slot 320Y' in the page table map 302' has been updated to page frame number 321B to translate the virtual page address 310X to point to the flash memory page Z 331Z'. The write protection bit 322W has been changed to the write protection bit 322W' to signal that the access through the virtual page address X 310X to the flash memory page Z 331Z' is a read access only with write accesses being trapped. Modification of the write protection bit may disallow random write access to the flash memory page Z 331Z'. After migrating the information to flash memory, the DRAM memory page Y 330Y is freed-up so that it may be used to store other information.

In implementations in which write access to the flash memory page Z is disallowed, if an application attempts to write using a store instruction to the protected flash memory page, the application is interrupted and a protection handler (e.g., the trap handler) in the operating system is given control to handle the write operation to the protected flash memory page Z 331Z'. The attempt to write to the protected page may be referred to as a general protection fault or a segmentation violation that is trapped by the operating system.

Figure 4:
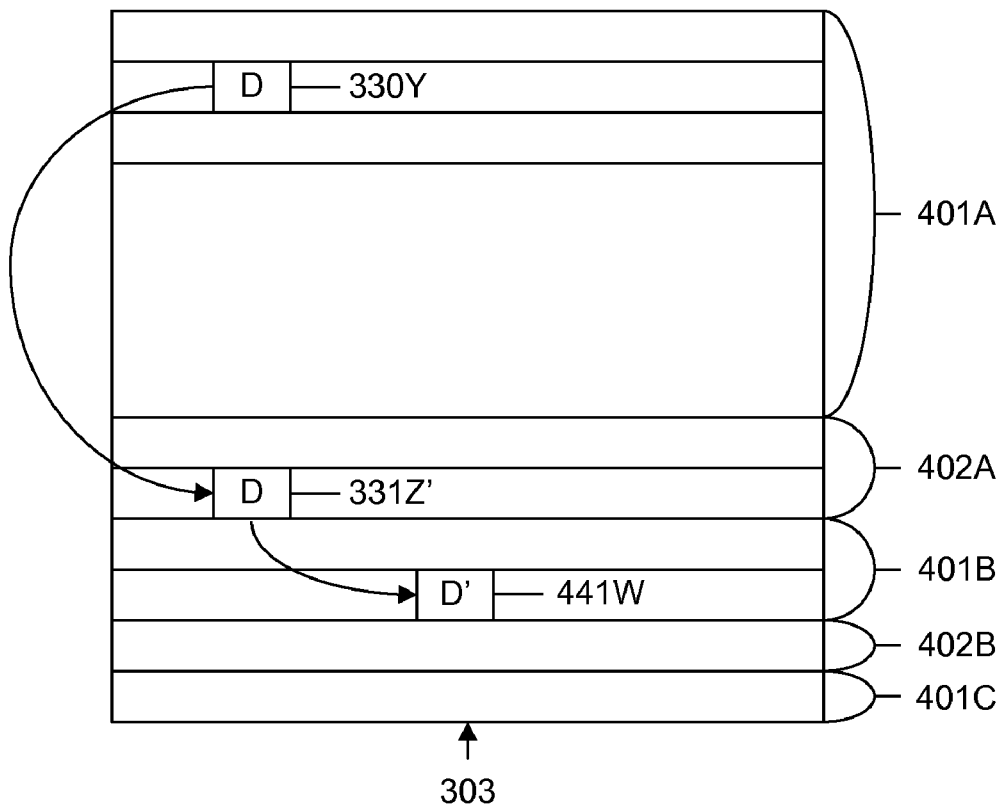
FIG. 4 is a diagram of main memory illustrating an example of migration of information between symmetric (e.g., DRAM) memory regions and asymmetric (e.g., flash) memory regions.

Referring to FIG. 4, consider, for example, a hybrid main memory 303 including one or more DRAM memory regions 401A-401C and one or more flash memory regions 402A-402B. A page 330Y of application code and/or data D may be stored in the DRAM memory region 401A of main memory 303 by an application program. Data may be moved into the flash memory regions directly from DRAM or from another source. In response, the application code and/or data D stored in page 330Y may be copied and written into a page 331Z' in the flash memory region 402A. The page 330Y in the DRAM memory region 401A may be thereafter freed and used for other purposes that require write access or that are less tolerant of access latency increases (e.g., the physical address for page 330Y may be put on a free list maintained by the operating system to indicate that it is unallocated to any process).

Because write access times into asymmetric memory devices may be significantly longer than read access times, a modified operating system may be configured to trap attempted write accesses into the asymmetric memory. The trap may be configured by setting the write protection bit in the page table entry to permit only read accesses. An attempt by the processor to write to a location on the corresponding page may trigger a protection fault. A protection fault handler or trap handler 125 can either complete the write (at the slower speed), or decide to copy back the page of data into a DRAM memory page and update it with the write access into the DRAM memory page. Such a DRAM memory page may also be marked, for example, in the page table, as being non-migratable into a flash memory page for a period of time so as to complete the update of the information by writing into the DRAM memory page. For example, the memory controller may create an access collections table, or modify a memory table to include parameters to track access to data in memory. Reading a virtual address may increment a read counter while writing a virtual address may increment a write counter or set a warning flag indicating that a write to the virtual address has been recently performed. The access collections table may be modified to include a time parameter indicating that the page should not be migrated for (1) a specified duration or monitoring cycle, or (2) until a threshold degree of reads are performed before another write operation is performed. The access collections table may track the amount of data written to storage and the elapsed time since the data was migrated to the asymmetric memory component. The amount of data written may be used in prioritizing which data is migrated to the asymmetric memory component so that larger amounts of data are favored as being computationally more efficient. The elapsed time since the data was migrated may be used to as an indicator of whether the data is likely to be subject to future write operations. Referring now to FIG. 4, if the application attempts to write to the protected flash memory page 331Z', a new DRAM memory page W 441W may be allocated in the main memory 303. The information content D may be copied into the DRAM memory page W 441W. In the slot of the page table map, the PFN is updated to indicate the DRAM memory page W 441W and the write protection bit 322W' is changed back to protection bit 322W such that the page is writable so that the application may write new information into the DRAM memory page W 441W. The information D is thereafter updated to information D' in the DRAM memory page W 441W.

Figure 6:
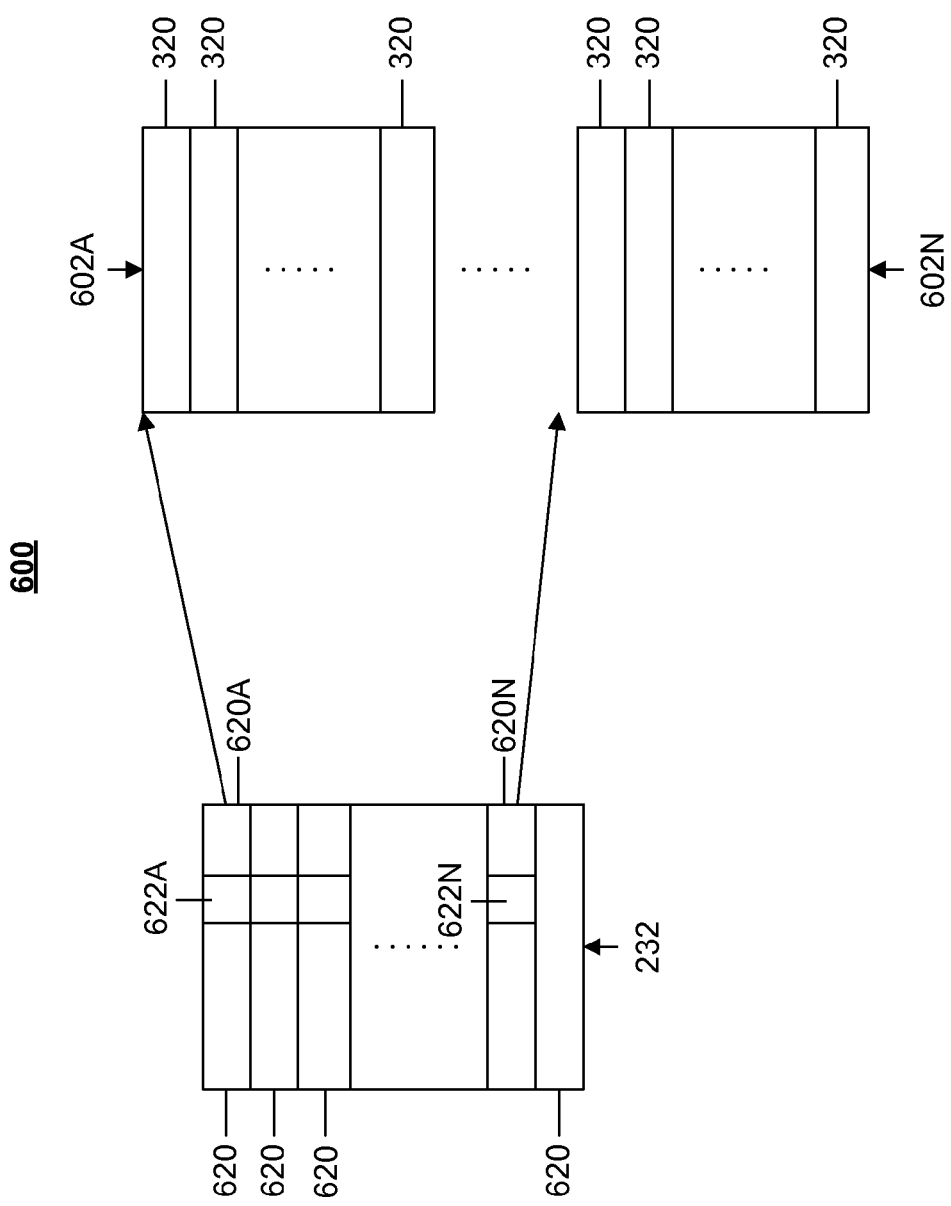
FIG. 6 illustrates an example of a multilevel mapping of virtual address space of an application running on a processor into a physical address space of a hybrid main memory using a shadow page table.

FIG. 6 illustrates a multilevel mapping 600 of virtual address space of an application running on a processor into a physical address space of a hybrid main memory by means of a shadow page table map. More precisely, and also referring back to FIG. 2, the hypervisor 104 maintains a shadow page table 222 to that of the page table 122 maintained by the operating systems in order to map virtual addresses of applications running under the control of one or more host operating systems to physical addresses in main memory 135. The shadow page table 222 in the hypervisor 104 is similar to the page table 122 maintained by the one or more host operating systems 102. However, in multilevel mapping 600, the hypervisor 104 alters the bits in the shadow page table 222.

The hypervisor supports executing one or more copies of a host operating system to provide the illusion of enabling multiple virtual machines on one physical machine. The hypervisor manages the allocation of raw hardware resources, including main memory, amongst the one or more virtual machines.

The shadow page table 222 in the hypervisor 104 is similarly managed as the page table 303 discussed previously to migrate information in DRAM memory regions into flash memory regions of a main memory. That is, the shadow page table 222 has its page table entries updated as information in DRAM memory pages are copied into flash memory pages and vice-versa. The hypervisor 104 also changes the write protection bits in the slots of the shadow page table 222 to protect the corresponding mapped flash memory pages from being written.

In one configuration, the hypervisor trap 225 works in conjunction with the kernel page table (KPT) 232 maintained by the hypervisor 104. In this configuration, the kernel page table 232 has one or more slots or page table entries 620 that point to the physical address for each process page table 602 of each respective operating system of each respective virtual machine maintained by the hypervisor. For example, entry 620A points to the process page table 602A for a first operating system of a first virtual machine. Entry 620N points to the process page table 602N of the Nth operating system of the Nth virtual machine. Each process page table 602 has page table entries 320 to map virtual addresses to physical addresses. For an operating system to allocate or modify a process page table 602, it ends up passing control to the hypervisor via with the kernel page table 232. Before the operating system can allocate or modify a process page table 602, the hypervisor trap 225 traps the instruction that wants to update information located in certain locations of the page table.

Upon initial allocation, the hypervisor allocates a process page table to a given operating system but prevents it from being written to by the operating system. This prevents the operating system from changing the bits in the process page table. In this configuration, this behavior is achieved as follows. Each slot or entry 620N in the kernel page table 232 includes a protection bit 622N to protect its associated process page table 602N from being written.

In one configuration, the DRAM memory resources freed up because of the migration of information from a page in a DRAM memory region to a page in the flash memory region of the hybrid main memory may be used by the hypervisor to support the memory requirements of other virtual machines. In a second configuration, these freed resources may be made available for use by the virtual machine from which they were recovered by dynamically expanding the memory allocation initially configured for that machine.

Figure 7:
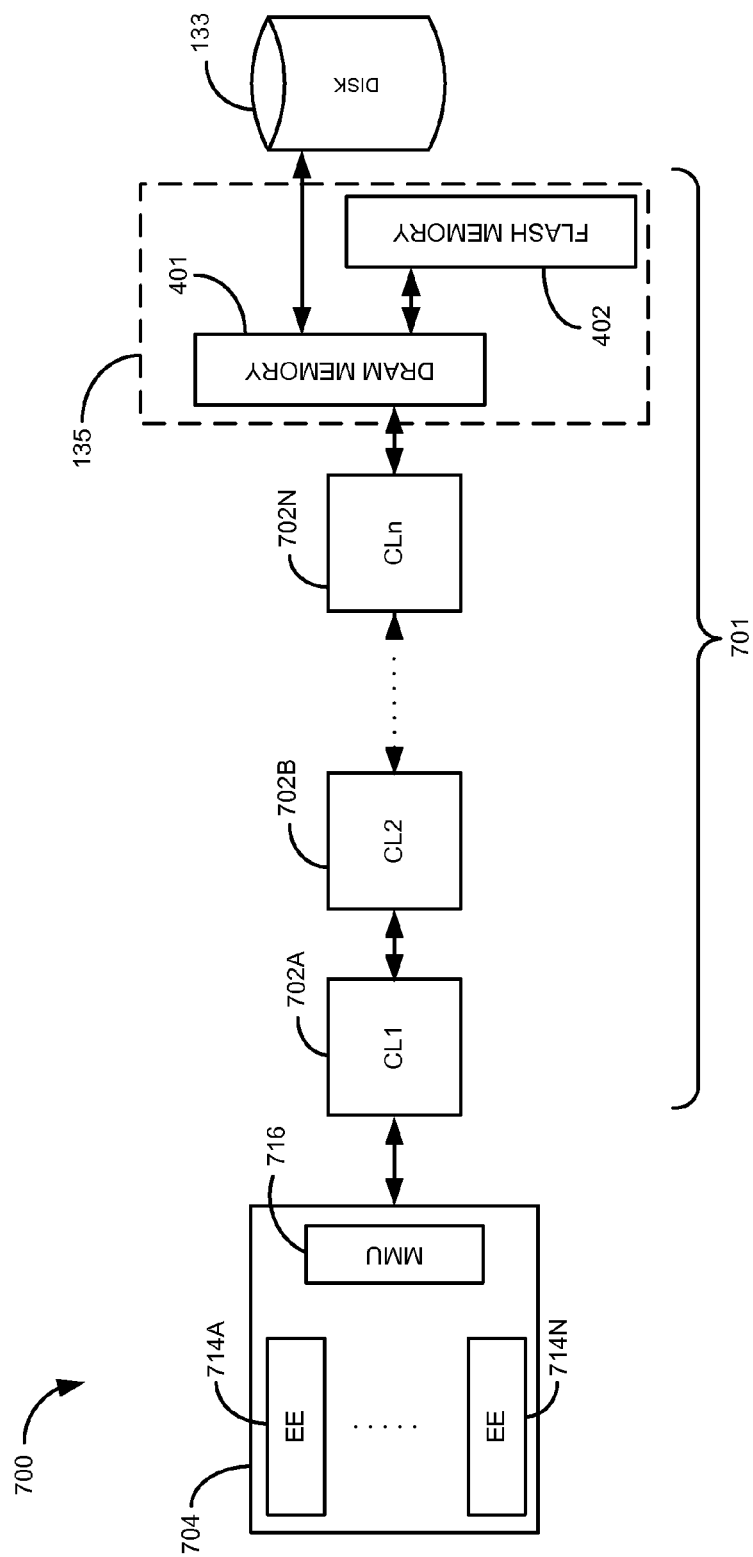
FIG. 7 is a block diagram of a computer system illustrating a memory hierarchy.

After a threshold of writes have been collected in the access collections table, or a threshold of time has passed, the information being collected in DRAM memory may be integrated back into NOR flash memory. The process for performing this migration may include using the same controlling logic that was used during the original move of information from DRAM into NOR. More precisely, and referring now to FIG. 7, a virtual memory hierarchy 701 for a computer system 700 is illustrated between a processor core 704 and hard disk storage 133. The processor core 704 may be a multiprocessor core including one or more execution engines 714A-714N. The memory hierarchy 701 may include one or more levels of cache memory 702A-702N and a hybrid main memory 135 with DRAM memory regions 401 and flash memory regions 402. Additionally, a computer system may have more than one processor core, each associated with its own levels of cache memory 702A-702N and possibly its own hybrid main memory 135. In one configuration, the memory closest or nearest to the processor (the fastest memory) has the fastest access times while the memory furthest from the processor (the slower memory) has slower access times.

A memory management unit 716, integrated with or separate from the processor core 704, working in cooperation with the operating system may bring forward pages of information associated with addresses in an application's virtual address space into main memory 135 to allow the execution engines to actively process this information. That is, the memory management unit 716 may page information by reading pages of information from the hard disk storage 133 into the main memory 135. Additionally, portions of the information may be brought forward into one or more levels of the cache memory 702A-702N. A valid bit in each slot in the page table corresponding to the page of memory is set to indicate a valid page in memory. If the page of information is no longer needed in main memory, the valid bit is cleared so that page of memory may be reused. If the page of information was updated, indicated by the setting of a dirty bit, the page of information may be written into the hard disk storage 133 by the operating system.

As the hard disk storage 133 may maintain a copy of each page in the memory hierarchy 701, the computer system may be configured so that pages of information in the memory hierarchy 701 are not pushed back down to slower memory in the memory hierarchy. However in implementations having a hybrid memory 135, pages of information may be pushed down the memory hierarchy 701 from DRAM memory regions 401 in the main memory, which may be a faster memory type, into flash memory regions 402 in the main memory, which may be a slower memory type while retaining its direct addressability in memory. Moreover, the hybrid main memory 135 has two different types of memory pools that are managed by the operating system or hypervisor, flash type memory regions and DRAM type memory regions. The DRAM type memory regions may be readily read-writeable. In contrast, the flash type memory regions may be readily readable but it is desirous to write infrequently into flash memory due to a slower write access time and the possibility of flash memory wear out.

D. Discussion of Operations Performed and Additional Configurations

FIG. 8 is a flow chart 800 of a process by which a data structure is accessed that has been stored as two portions accessible concurrently over a time period larger than that represented by a single access within symmetric and asymmetric memory components of main memory. The operations 800 described in the FIG. 8 flow chart are described as being performed with respect to a memory controller. In one configuration, the memory controller is implemented as a specialized software module in an operating system. In another configuration, the memory controller is implemented as an intermediary component that interfaces with specialized hardware logic configured to track how the hybrid memory system is being used. Thus, even though the operations are described as being performed with respect to one particular memory controller, the operations may be performed using other described herein and/or in a distributed manner.

Initially, the memory controller receives a command from an application to access a data structure associated with one or more virtual addresses mapped to main memory (810). Receiving the command may include receiving a single load instruction by the CPU that takes responsibility for performing the translation by performing looking up virtual addresses in the memory map. In one configuration, accessing a data structure includes receiving a request by an application to write to a first range of virtual addresses. In another configuration, accessing a data structure includes receiving a command to read a particular variable (or virtual block) associated with a large record, which particular variable is translated by the operating system into a collection or range of virtual addresses.

The memory controller configures symmetric and asymmetric memory components of the main memory to interface with a memory table controller (820). Generally, configuring symmetric and asymmetric memory components of the main memory to interface with the memory table controller includes establishing a physical and logical interconnect between the memory controller and main memory, which may include configuring the memory controller to use protocols and signaling responsive to the type of memory being accessed. Additional examples of establishing the physical and logical interconnections may include configuring the memory controller to exchange physical address and data information across interconnections with the memory storage systems. The physical address may be automatically loaded to a memory map across the interconnects as a result of performing reads and writes to the hybrid memory system. The memory controller also may be configured to selectively invoke symmetric and asymmetric memory protocols in response to identifying which type of memory component the memory controller is interfacing with.

The memory controller queries, based on the virtual addresses associated with the data structure implicated by the received command and from within the memory table controller with which the symmetric and asymmetric memory components interface, a memory table that manages first virtual addresses associated with first physical addresses in symmetric memory components and second virtual addresses associated with second physical addresses within asymmetric memory components (830). Querying the memory table includes referencing the memory table with a virtual address, or other virtual data structure, in order to reveal an association between the virtual reference and the physical address. For example, the operating system may request access information for a search index. As a large and complex data structure, the search index may be associated with numerous virtual address ranges and virtual blocks, and it may include constituent labels and subrecords that point to additional information.

The memory controller identifies, based on results of the query of the memory table, a first subset of the virtual addresses for the data structure having constituent addresses that are mapped to the symmetric memory components and a second subset of the virtual addresses for the data structure having constituent addresses that are mapped to the asymmetric memory components (840). For example, a search index may include a first collection of virtual addresses that map to the symmetric memory component and a second collection of virtual addresses that map to the asymmetric memory component. The virtual addresses may be mapped to the particular type of memory component using a physical address to identify the particular address in memory in which a portion of data is accessed.

In response to identifying at least one virtual address from within the first subset of virtual addresses for the data structure that is mapped to the symmetric memory components, the memory controller accesses data associated with the virtual address from the first physical addresses within the symmetric memory components (850). For example, where accessing the data includes performing a read operation, accessing the data associated with the virtual address from the first physical addresses includes reading the data from the symmetric memory component. In contrast, where accessing the data includes performing a write operation, accessing the data associated with the virtual address from the first physical addresses includes writing the data to the symmetric memory component, using for example, a random access write command.

Likewise, since some of the accessed data is associated with asymmetric memory components, in response to identifying at least one virtual address from within the second subset of virtual addresses for the data structure that is mapped to the asymmetric memory component, the memory controller accesses data associated with the virtual addresses from the second physical addresses within the asymmetric memory components (860). In configurations where accessing the data includes writing the data, the data may be written using a block write command to the asymmetric memory component. Storage may be initially allocated in the symmetric memory component, and structured in a block format. Once a threshold amount of data has been loaded to the block format in the symmetric memory component, the block may be written. In contrast, where accessing the data includes reading the data, the data may be read using a random access or page read from the asymmetric memory component (depending on the granularity of access permitted by the hybrid memory system and the memory controller).

Application access to the data associated with the symmetric and asymmetric memory components is then enabled without providing the application with an indication of whether the data is accessed from the symmetric memory component or the asymmetric memory component (870). For example, where the application requests access to a portion of the search index, the memory controller provides the portions of the search index without indicating to the application which aspects of the portions were stored in the symmetric memory component, and which portions were stored in the asymmetric memory component.

Figure 9A:
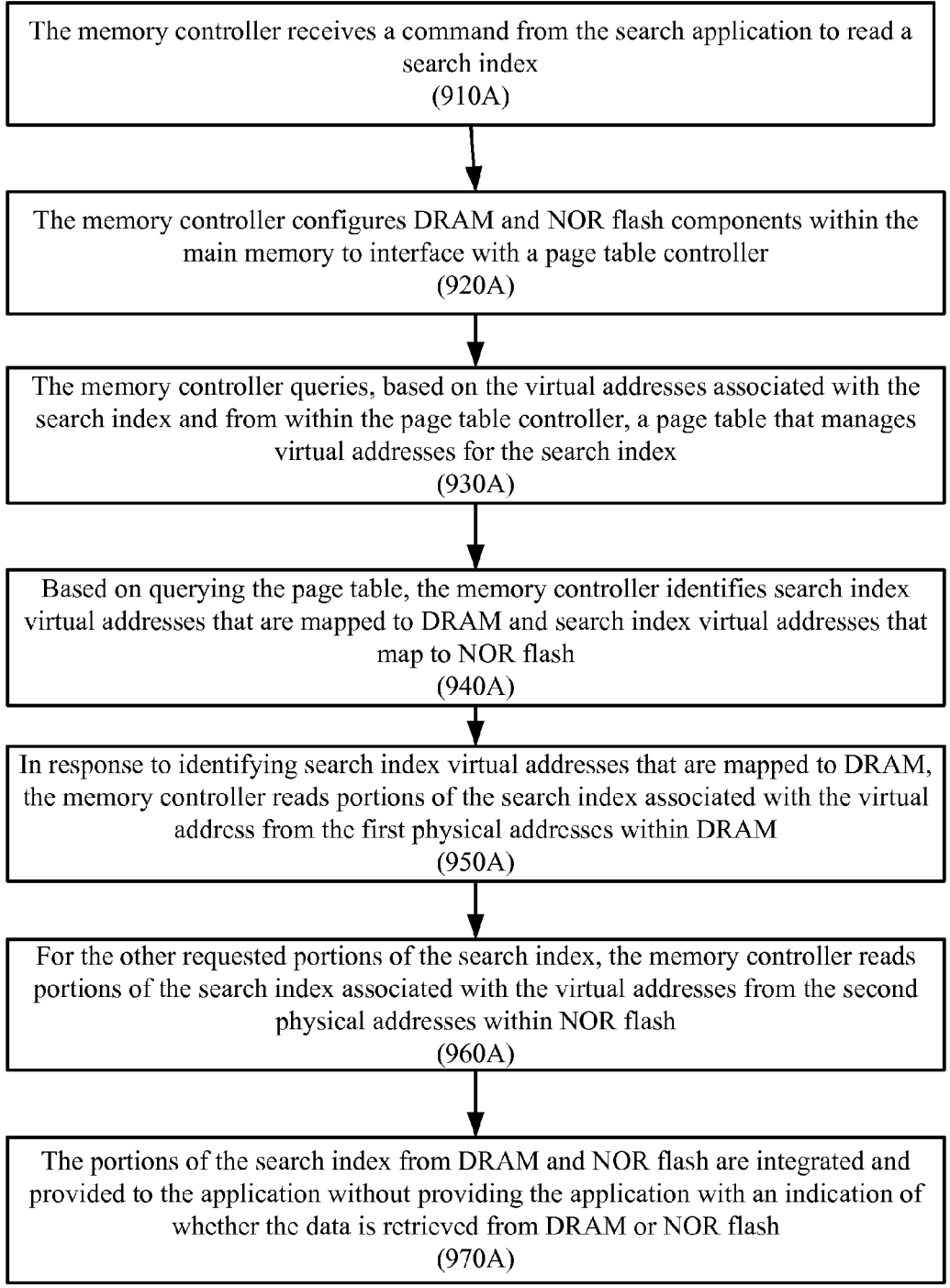
FIG. 9A is a flow chart of a process by which a search application reads a search index that has been stored in a hybrid memory system from DRAM and NOR flash as two portions accessible concurrently over a time period larger than that represented by a single access.
Figure 9B:
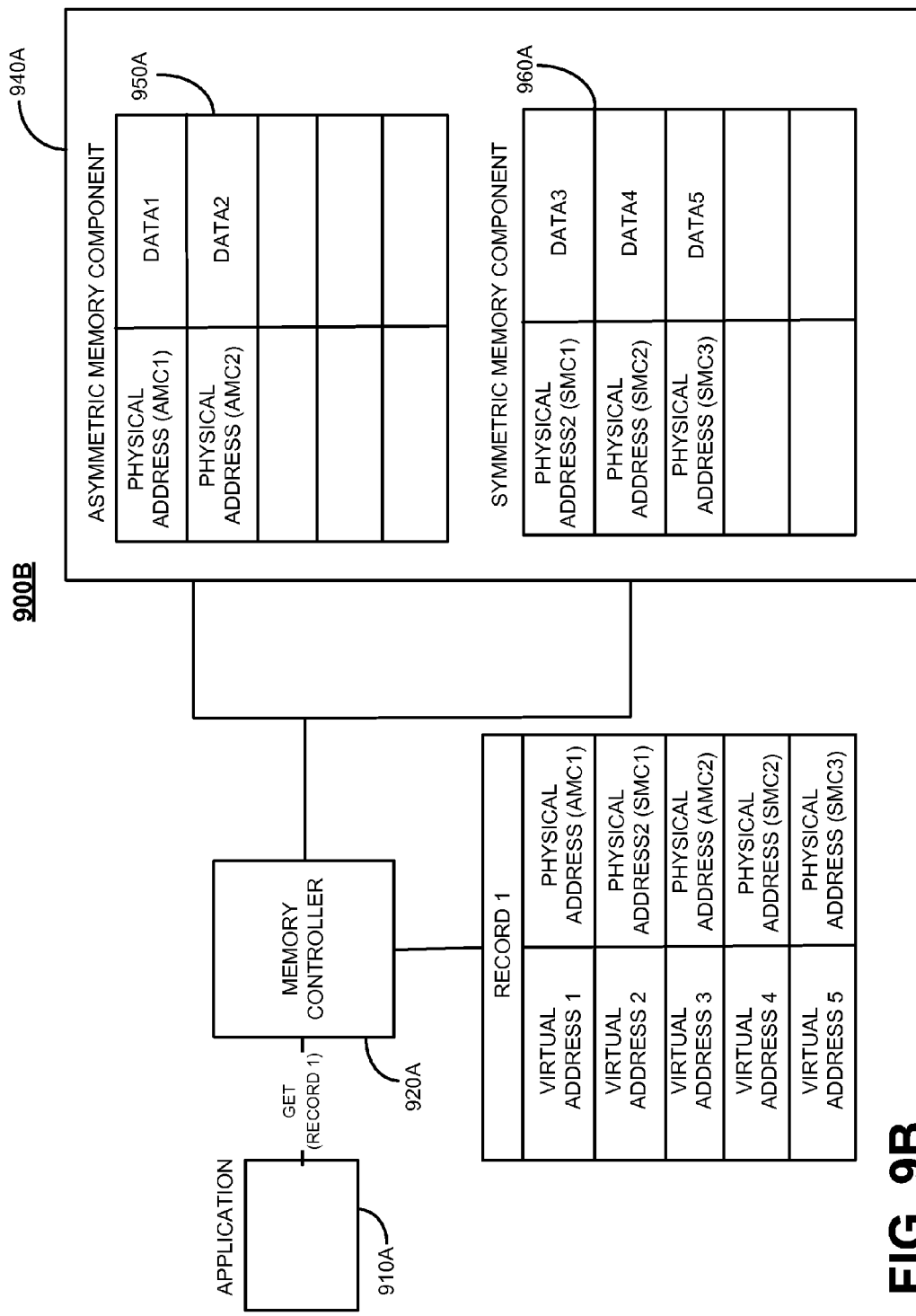
FIGS. 9B and 9C are block diagrams of a configuration of a computer system in which an application reads a data structure that has been stored as two portions accessible concurrently over a time period larger than that represented by a single access within symmetric and asymmetric memory components of main memory at two different instances in time
Figure 9C:
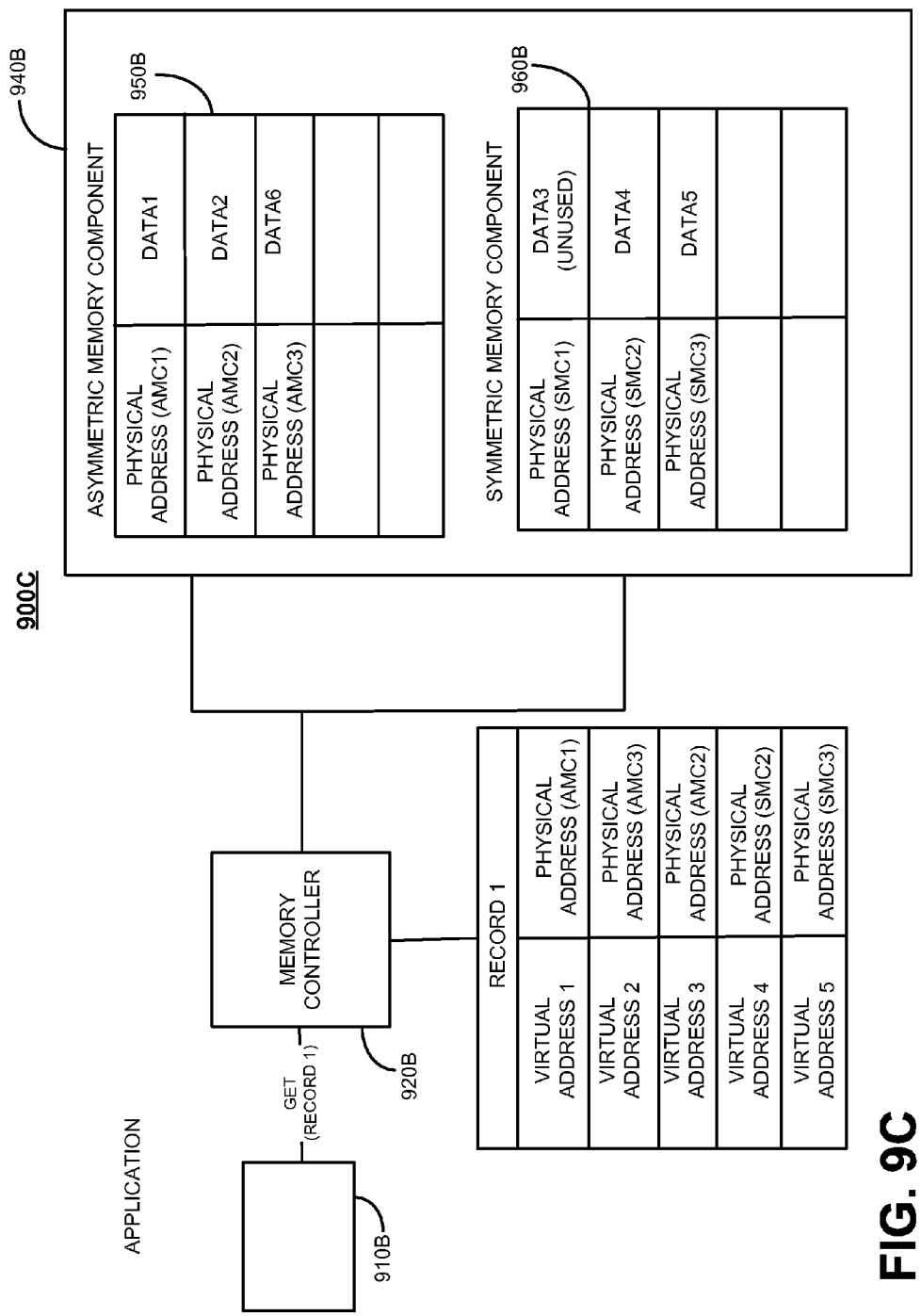
Figure 10B:
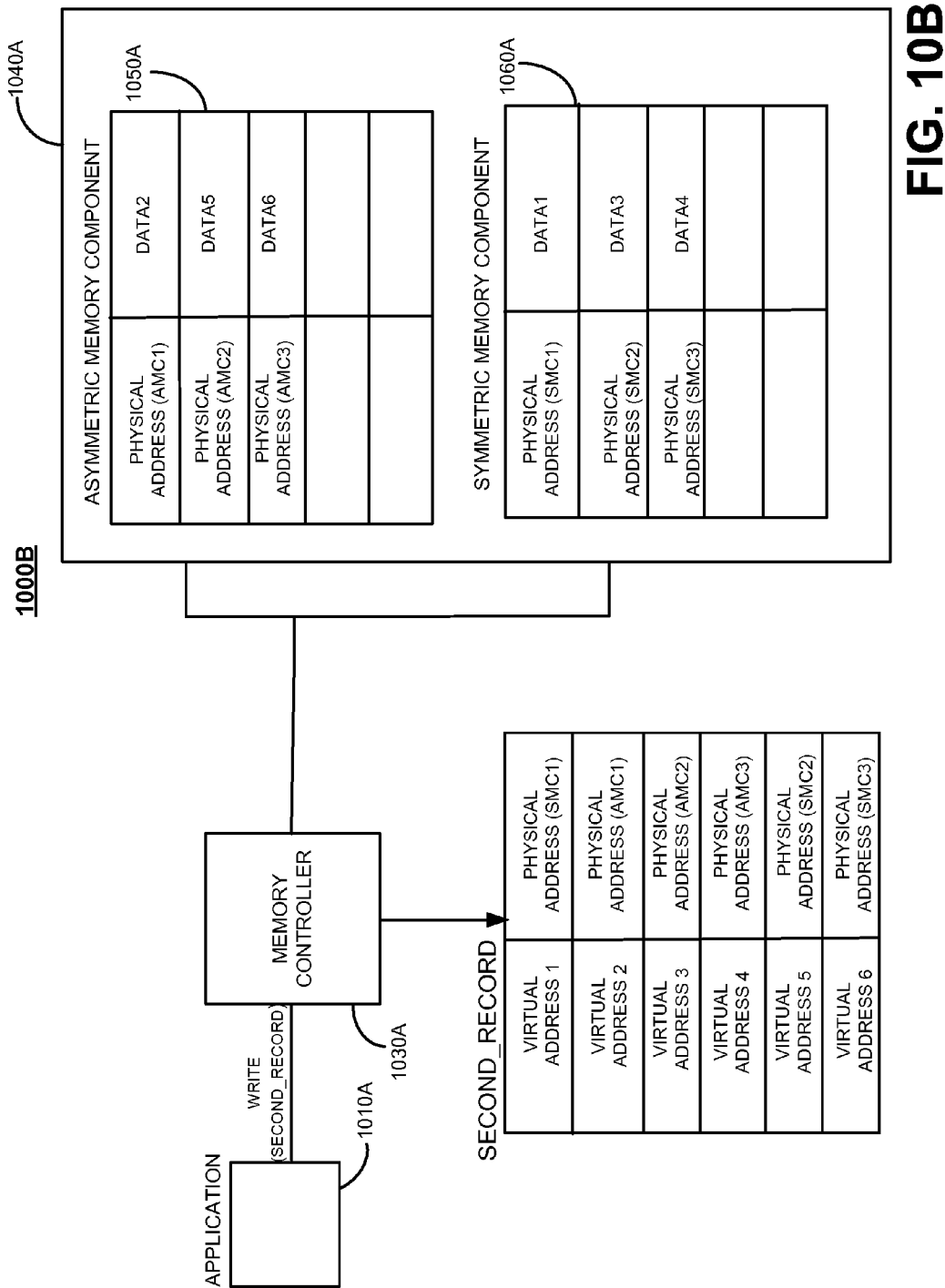

The operations in flow chart 800 were directed to general access operations performed in the course of supporting an application where the memory controller is configured to perform both read and write operations. FIGS. 9A-9C and 10A-10C illustrate how more detailed read and write operations are performed in the context of particular applications. More precisely, FIG. 9A illustrates a process by which a memory controller interfaces with a search application to perform read operations. FIGS. 9B-9C illustrate how the page table may change in the course of performing a read operation. Then, in contrast to the read operations configured to support the search application, FIG. 10A illustrates the process by which a database application performs a write operation. FIGS. 10B-10C illustrate how the page table may change in the course of performing a write operation.

Thus, FIG. 9A is a flow chart 900 of a process by which a search application reads a search index that has been stored in a hybrid memory system as two portions accessible concurrently over a time period larger than that represented by a single access from DRAM and NOR flash. The memory controller receives a command from the search application to read a search index (910A). For example, the search application may request those portions of the search index that relate to the subject "California". Reading the search index may include reading data from one or more virtual addresses associated with the subject "California".

The memory controller configures DRAM and NOR flash components within the main memory to interface with a page table controller (920A). Interfacing a memory controller with DRAM and NOR flash may include installing a specialized DIMM module into a DIMM socket within a server system. The specialized DIMM module may include DRAM and NOR flash modules, enabling the specialized DIMM module to support both read and write operations using both DRAM and NOR flash. The specialized DIMM module may include an internal memory controller enabling the internal memory controller to specify how data is stored in the DRAM and/or NOR flash. Interfacing DRAM and NOR flash with a memory controller also may include configuring data and addressing interconnects to interface with motherboard logic to enable a separate and distinct memory controller to automatically exchange data with the memory systems, and updating entries within a page table based on the automatically exchanged addresses and data.

The memory controller queries, based on the virtual addresses associated with the search index and from within the page table controller, a page table that manages virtual addresses for the search index (930A).

Based on querying the page table, the memory controller identifies search index virtual addresses that are mapped to DRAM and search index virtual addresses that map to NOR flash (940A). The search index virtual addresses may be interspersed. Put differently, constituent addresses that are mapped to the NOR flash may be immediately higher, immediately lower, or immediately higher and lower than other virtual addresses that map to DRAM. A first collection of discontinuous virtual addresses may be identified that map to the DRAM that are interspersed with the second collection of the discontinuous virtual addresses that map to NOR flash. The first collection and the second collection may be accessed in order to provide the search index read from the DRAM and NOR flash to the application. In one configuration, the memory controller identifies virtual addresses for those portions of the search index that are associated with the subject "California".

In response to identifying search index virtual addresses that are mapped to DRAM, the memory controller reads portions of the search index associated with the virtual address from the first physical addresses within DRAM (950A). For the other requested portions of the search index, the memory controller reads portions of the search index associated with the virtual addresses from the second physical addresses within NOR flash (960A). The portions of the search index from DRAM and NOR flash are integrated and provided to the application without providing the application with an indication of whether the data is retrieved from DRAM or NOR flash (970A). For example, the search index may be provided in the desired, organized manner designed to facilitate subsequent analysis. Providing the search index to the application may include providing the search index to the search application without requiring the search application to operate differently based on whether the data is stored in NOR flash. That is, the search application may be configured to perform identical operations, irrespective of whether portion of the search index is stored in DRAM or NOR flash.

In another configuration, providing the search index to the application without providing the application with an indication of whether the data is accessed within the symmetric memory component or the asymmetric memory component includes providing the search index to the application without revealing to the application whether the data is stored in NOR flash. Typically, the search application does not receive a parameter indicative of where the portion of the search index is stored. Similarly, the search application may be shielded from receiving addressing information (virtual or physical) that is determinative of where the search index is stored.

FIGS. 9B and 9C illustrate configurations of the page table that may be used to retrieve the search index that was described in FIG. 9A. Because the page table may change over time during a read operation, FIGS. 9B-9C illustrate how the page table may change during the course of the read operation. Thus, to illustrate how the page table may change over time, FIG. 9B is a block diagram of a configuration 900B in which, at a first instance in time, an application 910B interfaces with a hybrid memory system 940B through a memory controller 920B. As shown, application 910B is executing a read command for "RECORD 1." In one configuration, the application 910B requests "RECORD 1" itself using a GET command. In another configuration, intermediary processing is performed by the application (or by an intermediary system for benefit of the application) to identify virtual addresses. The memory controller includes a page table with a description of "RECORD 1". Specifically, the page table indicates that the virtual addresses are associated with "RECORD 1" and includes an indication of the physical addresses associated with the virtual addresses. The symmetric memory component 960B and the asymmetric memory component 950B include tables that associate the physical address with an entry (e.g., DATA1, DATA2). Thus, as a result of an application executing a GET(RECORD 1) command, virtual addresses are first identified. The memory controller then identifies physical addresses for each of the virtual addresses. The symmetric and asymmetric memory components then return data responsive to the received physical address. Depending on the granularity supported by the memory controller and/or memory component, executing a read command may include reading more than one entry (e.g., word).

A computer system can be a dynamic environment, particularly a system that is executing transactions, updating existing records, and generating new records. As a result, the page table may store different values at different times, even within execution of a single command. For example, and depending on whether the system supports out-of-order read and write instructions, reading a large data structure may span a number of cycles. In the case of a search index with 10,000 entries, the page table may exist in a first configuration as entry 1 is read, exist in a second configuration as entry 5,000 is read, and exist in a third configuration as entry 10,000 is read. The memory controller may use more configurations (e.g., states) where the system is acting as a multisource transaction processing system (e.g., processing transaction processing requests from thousands of Internet systems). Configuration 900C illustrates how the memory controller 920C maintains different associations at a different instance in time. The associations are different than those maintained by the memory controller 920B at a first instance in time. In particular, virtual address 2 is associated with physical address 2 in a symmetric memory component in a first instance in time and is associated with physical address 6 in an asymmetric memory component in a second instance in time. Notwithstanding storage in a different location in a different instance in time, an application executing a GET (RECORD_1) instruction reads the data associated with virtual address 2 irrespective of whether the data is stored in the symmetric memory component at a first instance in time or the symmetric memory component at a second instance in time.

Although FIG. 9A-C illustrate how a search application may be configured to read a search index from NOR flash, the memory controller also may be configured to support other applications as they write other data structures to NOR flash (or other types of asymmetric memory). FIG. 10A illustrates how a server running a database application may write updates, and FIGS. 10B-10C illustrate how the configuration of a page table in the server may change with respect to time. FIG. 10A is a flow chart 1000A of a process by which a database application writes updates or records to the database that has been stored as two portions accessible concurrently over a time period larger than that represented by a single access within DRAM and NOR flash. Initially, the memory controller receives a command from the database application to write an update associated with one or more virtual addresses mapped to main memory (1010A). For example, the database may include a transaction processing system for an airline reservation system. Receiving the command from the database application to write the update may include updating the database with all updates that have been received during a window of time.

A memory controller configures DRAM and NOR flash components to interface with the page table (1020A). As noted above with respect to operation 920A, configuring DRAM and NOR flash components to interface with the memory controller includes establishing logical and physical interconnections between the two systems. In one configuration, a memory map on the memory controller is configured to reflect available address space. If the database server has experienced a power failure or otherwise been interrupted, the memory controller may be configured to identify those portions of the database that have been stored in NOR flash and are still available for access (due to the non-volatile nature of NOR flash).

The memory controller queries a page table that manages first virtual addresses associated with first physical addresses in DRAM and second virtual addresses associated with second physical addresses within NOR flash (1030A). In one configuration, the memory controller is configured to receive write requests, and process the write requests by translating a virtual address provided by a MMU within the CPU to a physical address.

The memory controller identifies virtual addresses for the database having constituent addresses that are mapped to DRAM and virtual addresses for the database having constituent addresses that are mapped to NOR flash (1040A). For example, in the case of the airline reservation system, the memory controller may determine that the configuration of a master schedule for the next sixth months is stored in NOR flash and that flight configuration information for particular flights (e.g., seat availability) is stored in DRAM. Alternatively, the memory controller may update the master schedule with availability on a periodic basis (e.g., hourly) and accumulate updates to the master schedule with availability in DRAM.

The update associated with the virtual address from the first physical addresses within DRAM is written (1050A). Although the memory controller processes writes to NOR flash differently using a block write that creates a disruption region, the update associated with the virtual addresses from the second physical addresses within NOR flash also is written (1060A). In one configuration where writes to NOR flash are avoided in most configurations, writing the update may be redirected to DRAM or to another portion of NOR flash that is not disruptive to system performance. In another configuration where the memory controller determines that writing the NOR flash update to the second physical addresses is not disruptive, for example, because the disruption region in NOR flash is not being used, or the entire bank is being replaced, the memory controller may write the NOR flash update to second physical addresses.

As a result, the memory controller writes the update specified by the application to the DRAM and NOR flash components without providing the database application with an indication of whether the data is retrieved from the DRAM or the NOR flash (1070A). The application may receive an indication that an update to the airline ticketing and reservation system has been entered without receiving an indication of where the update has been written. FIGS. 10B-10C illustrate how a write command is supported. At a first instance in time, application 1010A executes a WRITE(SECOND_RECORD) command for a search index 1020B. The memory controller 1030B receives the write command and determines that the SECOND_RECORD is mapped to virtual addresses 1-6.

Some of the virtual addresses map to symmetric memory components, and some of the records map to asymmetric memory components. As a result of accessing the page table in the memory controller 1030B, the memory controller determines that virtual address 4 is associated with physical address (AMC3) in the asymmetric memory component 1050B within the hybrid memory system 1040B. In response to determining that the memory controller should not write SECOND_RECORD to the asymmetric memory component, the memory controller 1030B retrieves a physical address (SMC4) from the symmetric memory component 1060B and determines to write the update to the portion of SECOND_RECORD that maps to virtual address 4 to physical address (SMC4) in the symmetric memory component.

If SECOND_RECORD is a large enough record, or if writing the update occurs across a longer duration, the page table may be modified to reflect that other portions of SECOND_RECORD have been updated. Thus, as shown in FIGS. 10B and 10C, even though virtual address 1 includes a first value (DATA1) in FIG. 10B, virtual address 1 is updated in FIG. C and now includes a value of (DATA 7) as virtual address 4 is updated.

The nature of the reads, writes, and updates shown in FIGS. 9B-9C and 10B-10C may vary with the granularity of the reads and writes supported by the memory controller and memory components, the nature of the access operation being performed (e.g., random access read vs. block write), the size of the disruption region relative to the size of the write, the number of simultaneous operations, and the size of the data structure. In configurations where the size of any particular operation is large relative to the size of other operations that are performed, the likelihood and/or need to support a dynamic page table during execution of the particular operation is reduced. However, as the particular operations become small relative to a larger or complex operation being performed, enabling the memory controller to support a dynamic memory map during performance of the larger operation(s) enables an application to continue processing additional transactions, even if a first transaction is delayed due to its size and/or complexity.

Other implementations are within the scope of the claims. For example, although certain operations were described using certain systems, such as a hypervisor layer, other systems may be configured to perform the operations.

In another example, other useful implementations could be achieved if operations of the disclosed techniques were performed in a different order and/or if components in the disclosed systems were combined in a different manner and/or replaced or supplemented by other components. Accordingly, other implementations are within the scope of the following claims.

Although one or more operations are described as being performed by a particular agent, such as a memory controller, the agent may be configured to operate within one or more components within the computer system. For example, the memory controller may be configured to operate within the operating system, the hypervisor layer and/or an intermediary component. Alternatively, the memory controller may be configured to operate in a distributed manner.

What is claimed is:

1. A method of storing a data element in a hybrid main memory that includes symmetric and asymmetric memory components, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the method comprising:
   receiving, from an application, a command to store a data element in main memory that includes symmetric and asymmetric memory components;
   in response to receiving the command to store the data element in main memory, determining, using a memory controller, whether the data element resides in an asymmetric memory component of the main memory;
   in response to a determination that the data element resides in the asymmetric memory component of the main memory, identifying, using the memory controller, memory disruption characteristics related to storing the data element in the asymmetric memory component;
   based on the identified memory disruption characteristics related to storing the data element in the asymmetric memory component, determining, using the memory controller, whether to store the data element in the asymmetric memory component or a symmetric memory component; and
   in response to a determination to store the data element in the asymmetric memory component, storing the data element in the asymmetric memory component in satisfaction of the command received from the application.

2. The method of claim 1 wherein:
   identifying, using the memory controller, memory disruption characteristics related to storing the data element in the asymmetric memory component comprises:
   identifying a physical address of the data element within the asymmetric memory component of the main memory,
   identifying a disruption region within the asymmetric memory component of the main memory that corresponds to the identified physical address, and
   determining memory usage characteristics of the identified disruption region within the asymmetric memory component of the main memory; and
   determining, using the memory controller, whether to store the data element in the asymmetric memory component or the symmetric memory component comprises determining, using the memory controller, whether to store the data element in the asymmetric memory component or the symmetric memory component based on the determined memory usage characteristics of the identified disruption region within the asymmetric memory component of the main memory.

3. The method of claim 2 wherein determining, using the memory controller, whether to store the data element in the asymmetric memory component or the symmetric memory component based on the determined memory usage characteristics of the identified disruption region within the asymmetric memory component of the main memory comprises determining to store the data element in the asymmetric memory component conditioned on the determined memory usage characteristics of the identified disruption region indicating that storing the data element in the asymmetric memory component represents a relatively low level of disruption because the identified disruption region has a relatively low level of memory usage.

4. The method of claim 2 wherein determining, using the memory controller, whether to store the data element in the asymmetric memory component or the symmetric memory component based on the determined memory usage characteristics of the identified disruption region within the asymmetric memory component of the main memory comprises determining to store the data element in the symmetric memory component conditioned on the determined memory usage characteristics of the identified disruption region indicating that storing the data element in the asymmetric memory component represents a relatively high level of disruption because the identified disruption region has a relatively high level of memory usage.

5. The method of claim 1 wherein:
identifying, using the memory controller, memory disruption characteristics related to storing the data element in the asymmetric memory component comprises:
identifying a first size of the data element;
identifying a second size of a disruption region within the asymmetric memory component of the main memory in which the data element resides, and
identifying memory disruption characteristics that reflect a comparison of the first size of the data element and the second size of the disruption region within the asymmetric memory component of the main memory in which the data element resides; and
determining, using the memory controller, whether to store the data element in the asymmetric memory component or the symmetric memory component comprises determining, using the memory controller, whether to store the data element in the asymmetric memory component or the symmetric memory component based on the identified memory disruption characteristics that reflect a comparison of the first size of the data element and the second size of the disruption region within the asymmetric memory component of the main memory in which the data element resides.

6. The method of claim 5 wherein determining, using the memory controller, whether to store the data element in the asymmetric memory component or the symmetric memory component based on the identified memory disruption characteristics that reflect a comparison of the first size of the data element and the second size of the disruption region within the asymmetric memory component of the main memory in which the data element resides comprises determining to store the data element in the asymmetric memory component conditioned on the identified memory disruption characteristics that reflect a comparison of the first size of the data element and the second size of the disruption region within the asymmetric memory component of the main memory in which the data element resides indicating that storing the data element in the asymmetric memory component represents a relatively low level of disruption because the first size of the data element is relatively close to the second size of the disruption region.

7. The method of claim 6 wherein determining to store the data element in the asymmetric memory component comprises determining to store the data element in the asymmetric memory component conditioned on the first size of the data element being the same as the second size of the disruption region.

8. The method of claim 5 wherein determining, using the memory controller, whether to store the data element in the asymmetric memory component or the symmetric memory component based on the identified memory disruption characteristics that reflect a comparison of the first size of the data element and the second size of the disruption region within the asymmetric memory component of the main memory in which the data element resides comprises determining to store the data element in the symmetric memory component conditioned on the identified memory disruption characteristics that reflect a comparison of the first size of the data element and the second size of the disruption region within the asymmetric memory component of the main memory in which the data element resides indicating that storing the data element in the asymmetric memory component represents a relatively high level of disruption because the first size of the data element is smaller than the second size of the disruption region.

9. The method of claim 1 wherein:
receiving, from the application, the command to store the data element in main memory that includes symmetric and asymmetric memory components comprises receiving a CPU store instruction;
storing the data element in the asymmetric memory component in satisfaction of the command received from the application comprises:
identifying a physical address of the data element within the asymmetric memory component of the main memory,
modifying the CPU store instruction to use the identified physical address of the asymmetric memory component; and
executing the modified CPU store instruction to store the data element in the asymmetric memory component.

10. The method of claim 1 wherein:
receiving, from the application, the command to store the data element in main memory that includes symmetric and asymmetric memory components comprises receiving, from the application, a first store command to store the data element in main memory;
determining, using the memory controller, whether the data element resides in the asymmetric memory component of the main memory comprises determining, using the memory controller, that the data element resides in the asymmetric memory component of the main memory; and
determining, using the memory controller, whether to store the data element in the asymmetric memory component or the symmetric memory component comprises determining, using the memory controller, to store the data element in the asymmetric memory component; further comprising:
subsequent to receiving the first store command and storing the data element in the asymmetric memory component in satisfaction of the first store command received from the application, receiving, from the application, a second store command to store the data element in main memory;
in response to receiving the second store command to store the data element in main memory, determining, using the memory controller, to store the data element in a symmetric memory component of the main memory;
storing the data element in the symmetric memory component in satisfaction of the second store command received from the application; and
updating a memory table to indicate that the data element is stored in the symmetric memory component of the main memory.

11. The method of claim 10 further comprising:
subsequent to storing the data element in the symmetric memory component and updating the memory table, receiving, from the application, a read command to read the data element from main memory;
in response to receiving the read command to read the data element from main memory:

determining, using the memory table, that the data element is stored in the symmetric memory component of the main memory;

accessing the data element from the symmetric memory component of the main memory; and providing, to the application, the data element accessed from the symmetric memory component of the main memory in satisfaction of the read command received from the application without providing the application with an indication that the data element was accessed from the symmetric memory component of the main memory.

12. The method of claim 10 wherein the read command to read the data element from main memory is a first read command, further comprising:

subsequent to receiving the first read command and providing, to the application, the data element accessed from the symmetric memory component, performing a memory migration operation that moves the data element from the symmetric memory component of the main memory to the asymmetric memory component of the main memory and that updates the memory table to indicate that the data element is stored in the asymmetric memory component of the main memory;

subsequent to performing the memory migration operation, receiving, from the application, a second read command to read the data element from main memory, the second read command being the same as the first read command;

in response to receiving the second read command to read the data element from main memory:

determining, using the memory table, that the data element is stored in the asymmetric memory component of the main memory;

accessing the data element from the asymmetric memory component of the main memory; and providing, to the application, the data element accessed from the asymmetric memory component of the main memory in satisfaction of the second read command received from the application without providing the application with an indication that the data element was accessed from the asymmetric memory component of the main memory.

13. The method of claim 1 further comprising, in response to a determination to store the data element in the symmetric memory component, storing the data element in the symmetric memory component in satisfaction of the command received from the application.

14. The method of claim 1 wherein the symmetric memory component includes dynamic random access memory (DRAM) and the asymmetric memory component includes NOR flash, wherein:

receiving, from the application, the command to store the data element in main memory that includes symmetric and asymmetric memory components comprises receiving, from an application, a command to store a data element in main memory that includes DRAM and NOR flash;

determining, using the memory controller, whether the data element resides in the asymmetric memory component of the main memory comprises determining, using a memory controller, whether the data element resides in NOR flash;

identifying, using the memory controller, memory disruption characteristics related to storing the data element in the asymmetric memory component comprises identifying, using the memory controller, memory disruption characteristics related to storing the data element in NOR flash;

determining, using the memory controller, whether to store the data element in the asymmetric memory component or the symmetric memory component comprises determining, using the memory controller, whether to store the data element in NOR flash or DRAM; and in response to a determination to store the data element in the asymmetric memory component, storing the data element in the asymmetric memory component in satisfaction of the command received from the application comprises, in response to a determination to store the data element in NOR flash, storing, using a block write command, the data element in NOR flash in satisfaction of the command received from the application.

15. The method of claim 1 wherein:

the asymmetric memory component has asymmetric access characteristics including:

(1) the asymmetric memory component performs read operations at a first rate and performs write operations at a second rate that is more than an order of magnitude different than the first rate, (2) the asymmetric memory component uses an asymmetric memory access protocol, and (3) the asymmetric memory component includes non-volatile storage capability; and the symmetric memory component has symmetric access characteristics including:

(1) the symmetric memory component performs read operations at a rate that that differs by less than an order of magnitude from a rate at which write operations are performed, (2) the symmetric memory component uses a asymmetric memory access protocol, and (3) the symmetric memory component includes a volatile storage capability.

16. The method of claim 1 wherein storing the data element in the asymmetric memory component in satisfaction of the command received from the application comprises storing the data element in the asymmetric memory component in satisfaction of the command received from the application without basing activities of the application upon knowledge by the application that the data element is stored in the asymmetric memory component.

17. The method of claim 1 wherein storing the data element in the asymmetric memory component in satisfaction of the command received from the application comprises storing the data element in the asymmetric memory component in satisfaction of the command received from the application without requiring the application to operate differently based on whether the data element is stored in the asymmetric memory component.

18. The method of claim 1 wherein storing the data element in the asymmetric memory component in satisfaction of the command received from the application comprises storing the data element in the asymmetric memory component in satisfaction of the command received from the application without providing an indication to the application that the data element is stored in the asymmetric memory component.

19. A system that stores a data element in a hybrid main memory that includes symmetric and asymmetric memory components, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the system comprising logic that, when executed on a processor, causes the processor to perform operations comprising:

receiving, from an application, a command to store a data element in main memory that includes symmetric and asymmetric memory components;

in response to receiving the command to store the data element in main memory, determining, using a memory controller, whether the data element resides in an asymmetric memory component of the main memory;

in response to a determination that the data element resides in the asymmetric memory component of the main memory, identifying, using the memory controller, memory disruption characteristics related to storing the data element in the asymmetric memory component;

based on the identified memory disruption characteristics related to storing the data element in the asymmetric memory component, determining, using the memory controller, whether to store the data element in the asymmetric memory component or a symmetric memory component; and in response to a determination to store the data element in the asymmetric memory component, storing the data element in the asymmetric memory component in satisfaction of the command received from the application.

20. A system that stores a data element in a hybrid main memory that includes symmetric and asymmetric memory components, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the system comprising:

means for receiving, from an application, a command to store a data element in main memory that includes symmetric and asymmetric memory components;

means for, in response to receiving the command to store the data element in main memory, determining, using a memory controller, whether the data element resides in an asymmetric memory component of the main memory;

means for, in response to a determination that the data element resides in the asymmetric memory component of the main memory, identifying, using the memory controller, memory disruption characteristics related to storing the data element in the asymmetric memory component;

means for, based on the identified memory disruption characteristics related to storing the data element in the asymmetric memory component, determining, using the memory controller, whether to store the data element in the asymmetric memory component or a symmetric memory component; and means for, in response to a determination to store the data element in the asymmetric memory component, storing the data element in the asymmetric memory component in satisfaction of the command received from the application.

\* \* \* \* \*